(12) United States Patent
Williams et al.

(10) Patent No.: US 9,773,523 B2
(45) Date of Patent: Sep. 26, 2017

(54) APPARATUS, METHOD AND COMPUTER PROGRAM

(71) Applicant: Sony Corporation, Tokyo (JP)

(72) Inventors: Michael John Williams, Winchester (GB); Paul Edward Prayle, Basingstoke (GB); William Jack Leathers-Smith, Guildford (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/132,351

(22) Filed: Apr. 19, 2016

(65) Prior Publication Data
US 2016/0379682 A1 Dec. 29, 2016

(30) Foreign Application Priority Data

Jun. 29, 2015 (GB) .................................. 1511378.0

(51) Int. Cl.
*G11B 27/00* (2006.01)
*H04N 5/93* (2006.01)
(Continued)

(52) U.S. Cl.
CPC ...... *G11B 27/031* (2013.01); *G06F 17/30846* (2013.01); *G06K 9/00724* (2013.01); *G06K 9/00751* (2013.01); *G06K 9/00765* (2013.01); *G11B 27/34* (2013.01); *H04N 5/2224* (2013.01); *H04N 5/23296* (2013.01); *H04N 21/4333* (2013.01); *H04N 21/4394* (2013.01); *H04N 21/44008* (2013.01); *H04N 21/4728* (2013.01);
(Continued)

(58) Field of Classification Search
CPC . G11B 27/00; H04N 5/93; H04N 9/80; H04N 21/4781; H04N 21/8133; H04N 21/8146; H04N 21/4312
USPC .......................... 386/282, 278, 280, 248, 239
See application file for complete search history.

(56) References Cited

U.S. PATENT DOCUMENTS 6,144,375 A * 11/2000 Jain ................... G06F 17/30017
345/420
9,288,545 B2 * 3/2016 Hill ..................... H04N 21/4312
2009/0083787 A1 * 3/2009 Morris ............... H04N 5/44543
725/32

FOREIGN PATENT DOCUMENTS

EP 2 724 763 A1 4/2014
GB 2473059 3/2011
(Continued)

*Primary Examiner* — Daquan Zhao
(74) *Attorney, Agent, or Firm* — Oblon, McClelland, Maier & Neustadt, L.L.P.

(57) ABSTRACT

An apparatus for analyzing a video recording of a sporting event, comprising: a video clip generating circuitry operable to, in response to a selection of one of a first timeline element, generate a video clip from a video recording of the sporting event and to output the video clip for display, the video clip being a portion of the video recording of a sporting event temporally extending between a first time and a second time, each of the start time and the end time of a first event record corresponding to the selected first timeline element being within a period defined between the first time and the second time, and the video clip comprising one or more cut out portions of the video recording of the sporting event, each cut-out portion being generated on the basis of participant tracking data of the participant of the sporting event identified by a identifier of the first event record corresponding to the selected first timeline element.

13 Claims, 26 Drawing Sheets

(51) Int. Cl.
*G11B 27/031* (2006.01)
*G06F 17/30* (2006.01)
*H04N 5/232* (2006.01)
*G11B 27/34* (2006.01)
*G06K 9/00* (2006.01)
*H04N 5/222* (2006.01)
*H04N 21/472* (2011.01)
*H04N 21/4728* (2011.01)
*H04N 21/6587* (2011.01)
*H04N 21/433* (2011.01)
*H04N 21/439* (2011.01)
*H04N 21/44* (2011.01)
*H04N 21/8549* (2011.01)
*H04N 9/80* (2006.01)
*G03B 37/04* (2006.01)

(52) U.S. Cl.
CPC ... *H04N 21/47217* (2013.01); *H04N 21/6587* (2013.01); *H04N 21/8549* (2013.01); *G03B 37/04* (2013.01); *G06T 2207/30221* (2013.01)

(56) References Cited

FOREIGN PATENT DOCUMENTS

| | | |
|---|---|---|
| GB | 2512621 | 10/2014 |
| WO | WO 2013/171658 A1 | 11/2013 |

\* cited by examiner

| Start Time | End Time | Identifier |
|---|---|---|
| 00:05:37 | 00:06:14 | Player 1 ~800 |
| 00:08:13 | 00:08:43 | Player 2 ~802 |
| 00:08:20 | 00:08:49 | Player 3 ~804 |
| 00:08:10 | 00:08:52 | Free Kick ~806 |
| 00:11:12 | 00:11:33 | Player 2 ~808 |
| 00:10:58 | 00:11:41 | Yellow Card ~810 |
| . | . | . |
| . | . | . |
| . | . | . |
| . | . | . |

FIG. 8

APPARATUS, METHOD AND COMPUTER PROGRAM

CROSS REFERENCE TO RELATED APPLICATIONS

The present application claims priority to United Kingdom Application 1511378.0 filed on 29 Jun. 2015, the contents of which being incorporated herein by reference in its entirety.

BACKGROUND

The present disclosure relates generally, but not exclusively, to an apparatus, method and computer program.

BACKGROUND TO THE DISCLOSURE

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

It is known to provide a super-high resolution image of a captured live event such as a soccer match. These super high resolution images are formed from stitching together two or more high definition or 4K images. A cut-out of the super high resolution image can be created which mimics the output of a broadcast video camera capturing the image in real-time. This cut-out (or virtual camera view) can be fed to a device such as a smartphone, tablet or television for viewing by the user. An example of this type of system is found in patent application GB2473059 (derived from UK patent application GB0915114.3) filed by Sony Corporation.

Whilst this system has many advantages, such as the ability to perform automatic object tracking, the recent development of very high definition displays such as 4K displays, and even 8K displays in the future, means that the quality of the cut-out image becomes very important. In other words, as the cut-out is created from a larger image, where a high zoom is applied to the virtual camera view, the output may lack clarity when displayed on a very high definition display.

It is therefore desirable to improve the clarity of the output of the camera whilst still maintaining the ability to perform object tracking. An aim of embodiments of the disclosure is to address this.

SUMMARY

The present disclosure provides an apparatus for analysing a video recording of a sporting event, comprising: first receiver circuitry operable to receive a plurality of first event records, each first event record indicating a start time, an end time and an identifier of a participant of the sporting event; timeline generator circuitry operable to generate a timeline of the sporting event and to output the timeline for display, wherein the timeline indicates an elapsed time of the video recording of the sporting event along a first axis, the timeline indicates the identifier of the participant of the sporting event of each first event record along a second axis, and the timeline comprises a plurality of first timeline elements each corresponding to a respective first event record, each first timeline element extending along a portion of the first axis defined between the start time and the end time of its corresponding first event record and each first timeline element extending along a portion of the second axis associated with the identifier of the participant of the sporting event of its corresponding first event record; second receiver circuitry operable to receive participant tracking data indicative of a position of each participant of the sporting event identified by the identifier of one of the first event records at each of a plurality of times during the elapsed time of the video recording of the sporting event; input circuitry operable to receive an input to select one of the first timeline elements when the timeline is displayed; and video clip generating circuitry operable to, in response to the selection of one of the first timeline elements, generate a video clip from the video recording of the sporting event and to output the video clip for display, the video clip being a portion of the video recording of the sporting event temporally extending between a first time and a second time, each of the start time and the end time of the first event record corresponding to the selected first timeline element being within the period defined between the first time and the second time, and the video clip comprising one or more cut out portions of the video recording of the sporting event, each cut-out portion being generated on the basis of the participant tracking data of the participant of the sporting event identified by the identifier of the first event record corresponding to the selected first timeline element.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Embodiments of the present disclosure will now be described by way of example only and with reference to the accompanying drawings, in which:

FIG. 8 shows data collected at a soccer match according to an embodiment of the present disclosure;

DESCRIPTION OF THE EMBODIMENTS

Figure 1:
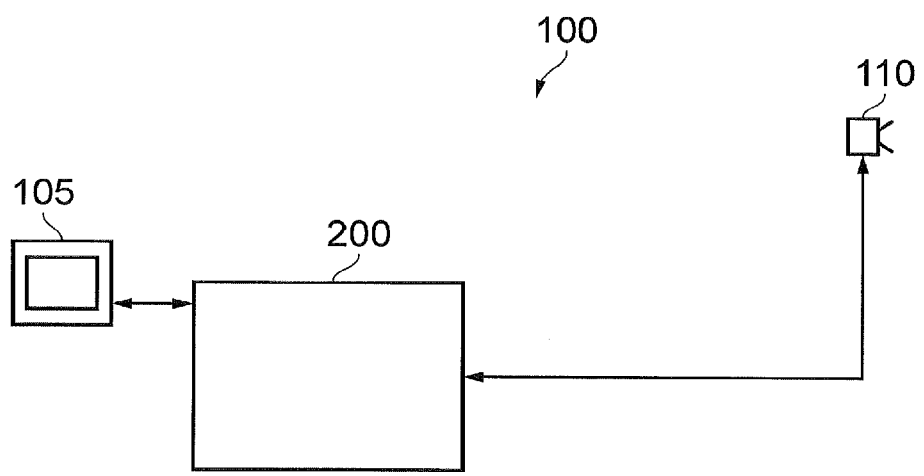
FIG. 1 shows a system according to embodiments of the disclosure.

Referring now to the drawings, wherein like reference numerals designate identical or corresponding parts throughout the several views.

Camera Motion Control

FIG. 1 shows a system 100 according to embodiments of the disclosure. The system 100 includes a terminal 105 connected to an image processing apparatus 200 according to embodiments. The terminal 105 may be connected over a wireless or wired connection. Additionally, the wired or wireless connection may be a direct connection or may be over a network such as a local area network or a wide area network. In embodiments, the terminal 105 may be a personal computer, but may, instead, be a tablet, smartphone or the like.

The image processing apparatus 200 is also connected to a camera arrangement 110. The camera arrangement 110 may be a single camera or may be a cluster of cameras arranged with overlapping fields of view. If the camera cluster arrangement is provided, then a super-high resolution image will be ultimately created. The camera cluster arrangement and the generation of the super-high resolution image is known and is described in GB2473059A, the contents of this document is incorporated in its entirety by reference. However, unlike the disclosure in GB2473059A, in embodiments of the disclosure, the pitch, zoom, and roll of the or each camera will be remotely controlled. In other words, unlike the cameras in GB2473059A which are stationary, the pan, tilt and zoom of the camera or cameras in the present disclosure are remotely controlled. An example of such a suitable camera for the present disclosure is the Sony® BRC-H900.

Figure 2:
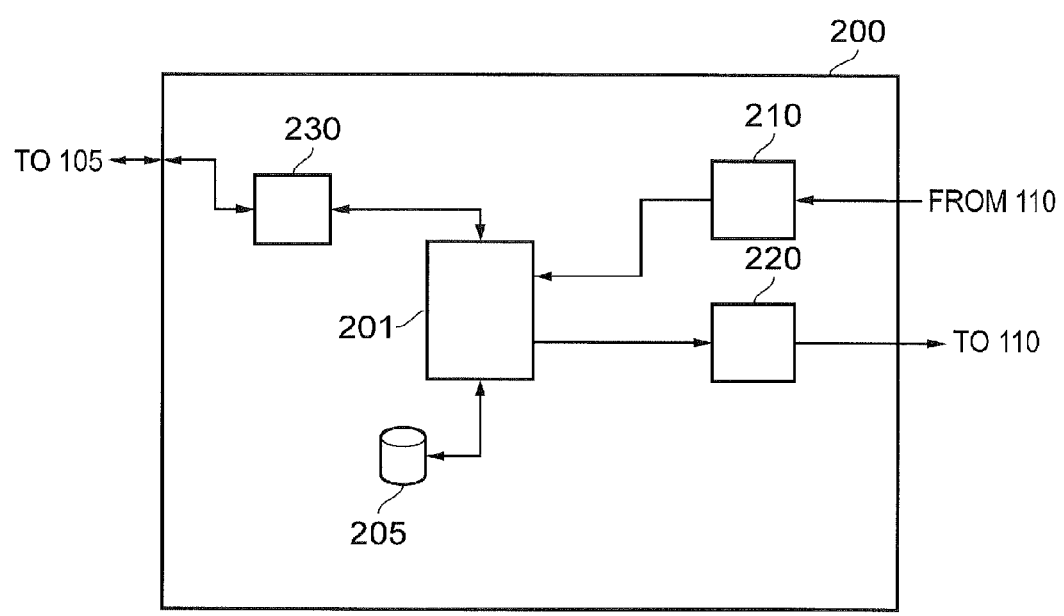
FIG. 2 shows an image processing apparatus according to embodiments of the disclosure.

FIG. 2 shows the image processing apparatus 200 according to embodiments in more detail. The image processing apparatus 200 has an input/output port that is connected to the terminal 105, either directly using a wired or wireless connection or via a network. The input/output port is connected to a terminal connection unit 230 that sends information to the terminal device 105 and receives instructions from the terminal device 105. The terminal connection unit 230 is connected to a processor 201. Of course, although the foregoing has an input/output port, it is envisaged that these may in fact consist of two or more separate ports.

The processor 201 is controlled using computer program code that is stored in a storage unit 205. The computer program code, when loaded onto the processor 201 controls the operation of the processor 201. The storage unit 205 may be semi-conductor storage, magnetic storage or optical storage. As will be apparent later, the storage unit 205 stores the captured video and metadata associated with the video. Other data may be also stored in the storage unit 205 as will be explained.

Also connected to the processor 201 is a camera input unit 210 and a camera output unit 220. The camera input unit 210 receives the image from the or each camera in the camera arrangement 110. The camera output unit 220 controls the pan, tilt and zoom of the or each camera in the camera arrangement 110 and sends instructions to the or each camera in the camera arrangement 110 accordingly.

The camera input unit 210 contains the chromatic aberration corrector, the image alignment means, the virtual projection means, the camera parameter calculation means, the colour correction means, the exposure correction means and the image stitching means of GB2473059A. The function of the camera input unit 210 in a camera arrangement 110 having multiple cameras is to provide firstly a stitched super-high resolution image. However, in addition, the camera input unit 210 maps the pixel position output from each camera in the arrangement into a position on a virtual plane so that a virtual camera view can be produced. The output of the camera input unit 210 which is fed to the processor 201 is therefore a super-high resolution image formed of a plurality of high resolution images. Of course, if the camera arrangement 110 contains a single camera, then no image stitching is required. However, it is still necessary for the camera input unit 210 to map the pixel position output from the camera in the arrangement into a position on the virtual plane so that the virtual camera view can be produced. Therefore, in the case of a single camera in the camera arrangement 110, only the virtual projection means and the camera parameter calculation means is provided in the camera input unit 210.

Also provided to the processor 201 is the current pan, tilt and zoom parameters of each camera in the camera arrangement 110. These values will be used by the processor 201 to determine the current position on a virtual plane of the camera field of view. This will be explained later.

Figure 3A:
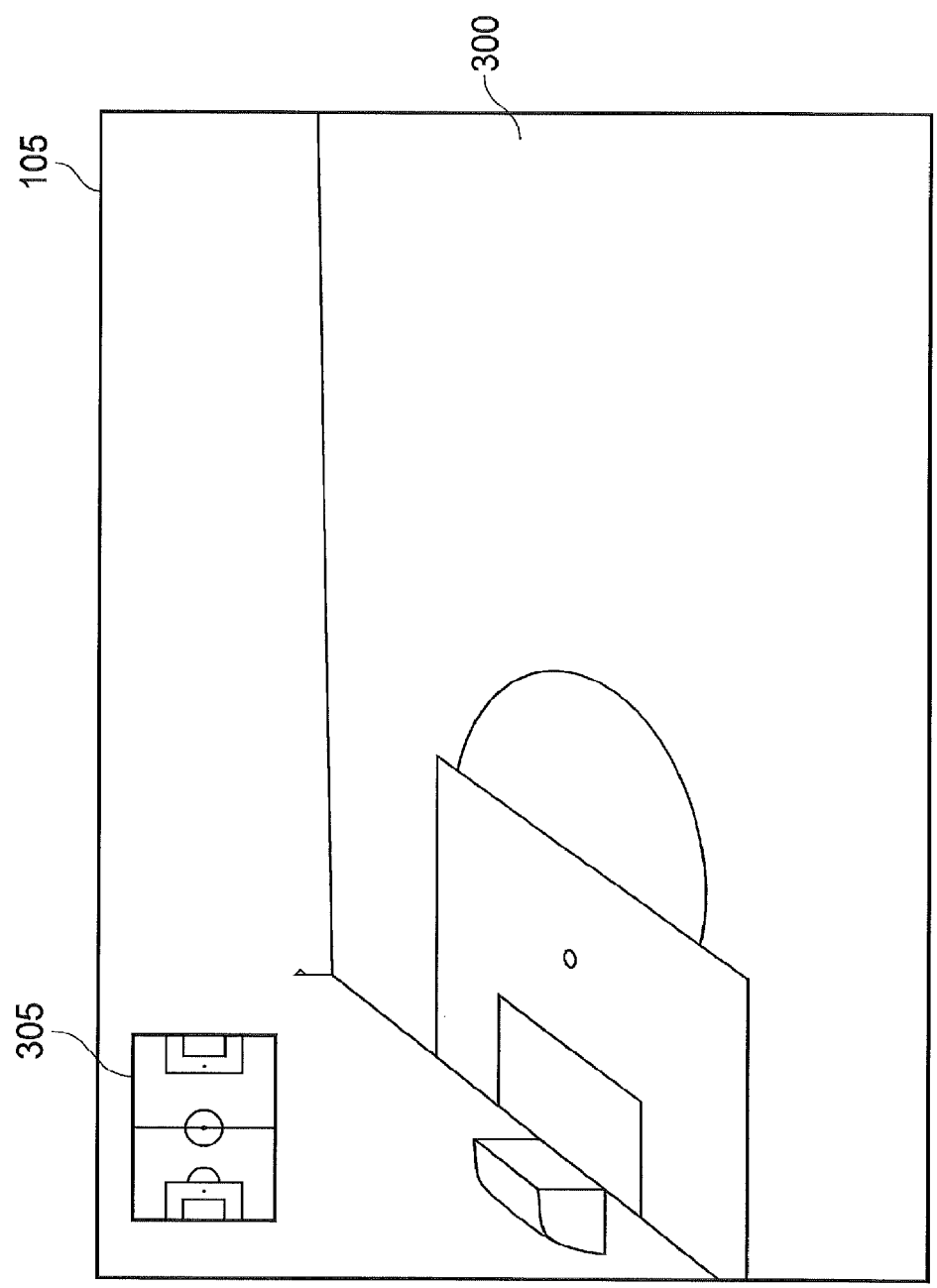
FIGS. 3A and 3B show a screen display explaining a calibration process.

FIG. 3A shows a screen shot from the terminal 105 during a calibration stage. In the following, the terminal 105 is a tablet computer such as a Sony® Xperia® Tablet. However, any tablet is envisaged. Additionally, the terminal 105 may be a personal computer with a display. The display may be a touch screen display or any kind of other display.

It should be noted that the calibration stage is known and is explained in, for example, GB2473059A.

On the display of the terminal 105 there is an image of a part of a soccer pitch 300. Although only a part of the soccer pitch is shown, in reality the entire soccer pitch may be shown. The pan, tilt and zoom of the camera in the camera arrangement 110 for this field of view is sent to the processor 201.

Figure 3B:
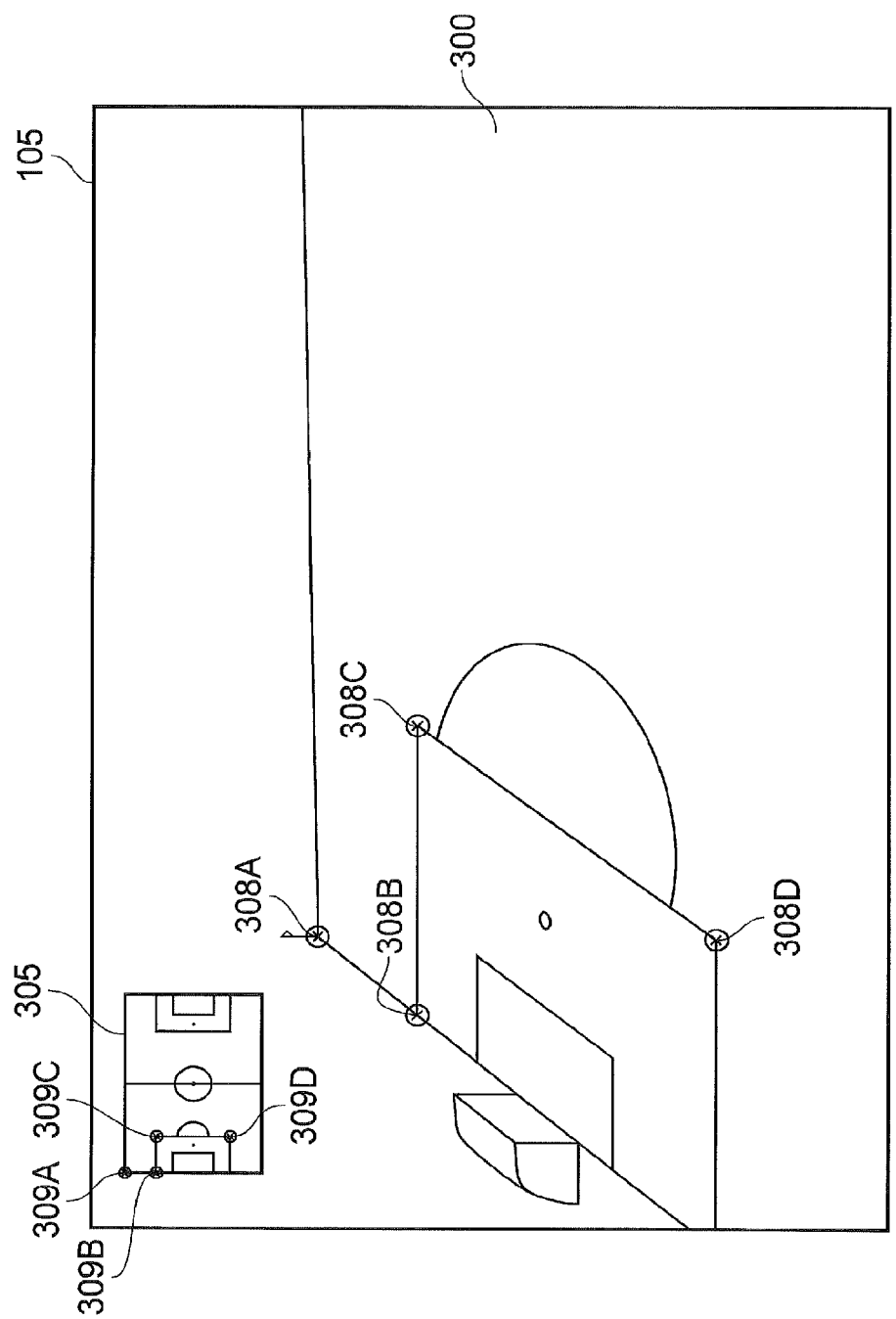

Additionally located on the display of the terminal 105 is an overhead map 305 of the entire pitch. As known to the skilled person, the user of the terminal 105 selects one point on the overhead map 305 and selects a corresponding point in the image of the part of the soccer pitch 300. In the example of FIG. 3B this is shown. Firstly, the user selects point 309A on the overhead map 305 where the corner flag is located. The user then selects point 308A on the image 300. Secondly, the user selects point 309B on the overhead map 305 and then selects point 308B on the image 300. The user continues to select points of intersections on the overhead map and the corresponding points on the image 300. In the example of FIG. 3B, the user of the terminal 105 selects points 309C and 309D on the overhead map 305 and the corresponding points 308C and 308D on the image 300 respectively. As explained in GB2473059A and known to the skilled person, this provides a mapping between the pixel position on the image 300 and a particular point on the virtual plane shown as the overhead map 305. Moreover, as the real-life distance between the different points on the image 300 is known, it is possible to map the particular points to specific points on the soccer pitch. In other words, as the distance between the intersections 308A and 308B, 308B and 308C and 308C and 308D on the real life soccer pitch is known, it is possible to map the position of an object in the image to both the real life soccer pitch and to the virtual plane for a given amount of yaw, pitch and zoom.

Figure 4A:
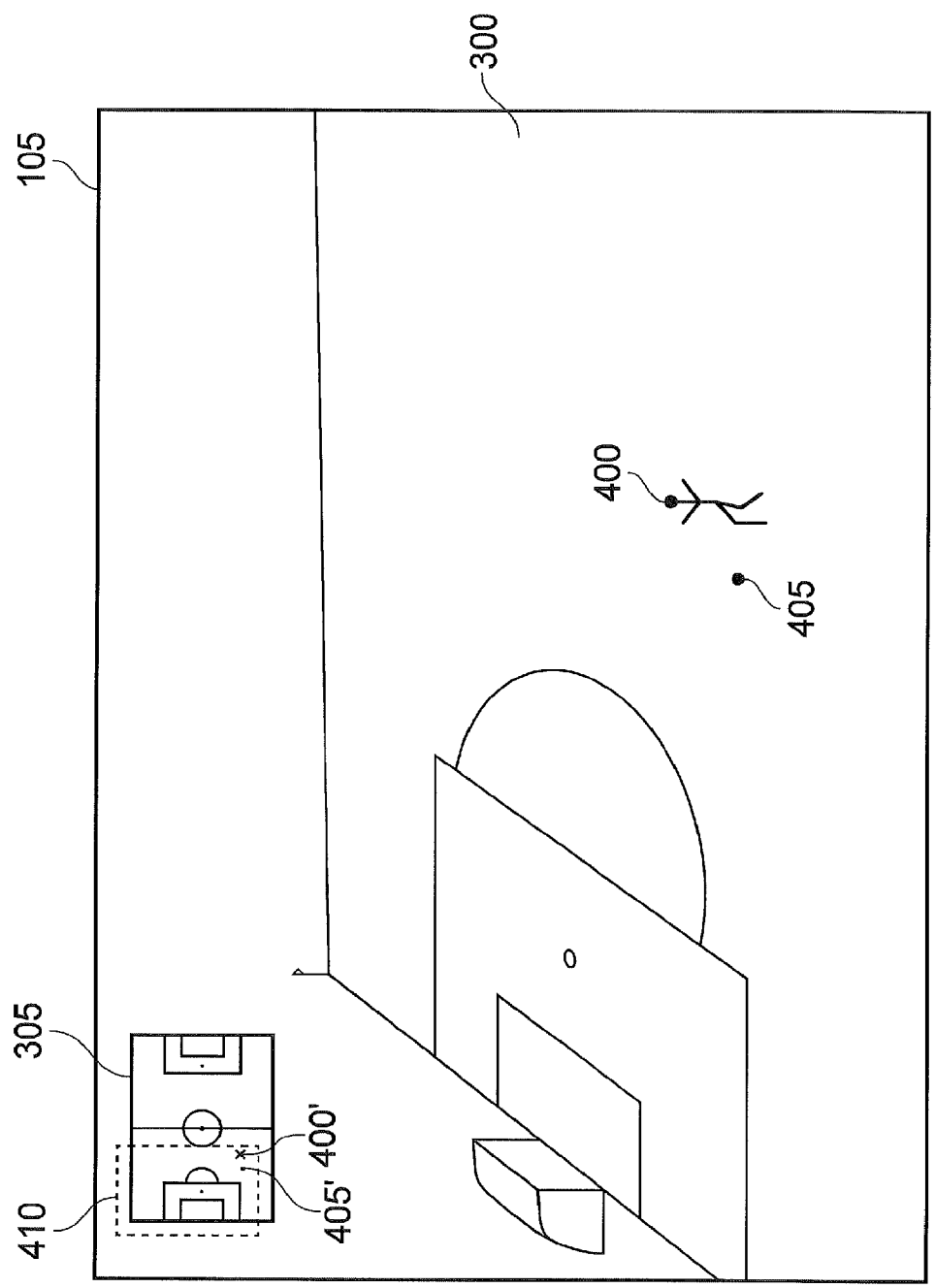
FIGS. 4A to 4C show object detection and tracking used in the system of FIG. 1.

FIG. 4A shows an image of the soccer pitch in operation; or in other words, after calibration of the system described in FIGS. 3A and 3B.

A player 400 is seen running on the pitch. The player 400 is chasing ball 405. The location of the player in the image 305 is identified using, in this example, a known object recognition technique. In other words, for each image 300 captured by the camera in the camera arrangement 110, an object detection algorithm is performed. This identifies the presence and location within the image 300 of the object. In this case, the object recognition system identifies the presence and location of the player 400. However, the object recognition system may be configured to detect the presence and location of the ball 405 or any other object. Of course, the position of the player, or any object in the image can be determined by any suitable means such as manually or the like.

Further, it is envisaged that not only will a certain object be detected and tracked between consecutive images, but the system will also identify a specific individual player from the image. This may be achieved by tracking facial features or a number on the shirt or shorts of the player. The location of the player within the image 300 is stored within the storage unit 205. Additionally stored within the storage unit 205 are the frame of video and the camera parameters of the or each camera in the camera arrangement 110.

As the user performed the calibration process as explained in FIGS. 3A to 3C, the processor 201 converts the detected position of object 400 in the image 300 into a corresponding position on the virtual plane shown in the overhead map 305. This enables the position of the player 400' to be marked on the overhead map 305. Moreover, the position of the ball 405' is also marked on the overhead map 305.

Additionally shown on the overhead map 305 is a camera field of view marking 410. The field of view marking 410 shows on the overhead map 305 the field of view of the camera in the camera arrangement 110. This is calculated by the processor 201. The field of view marking 410 is derived from the pixel positions of the image 300 for a given value of zoom, yaw and pitch calculated during the calibration step.

It is useful to provide the field of view marking 410 as the user of the terminal 105 can see the area of pitch in view.

Figure 4B:
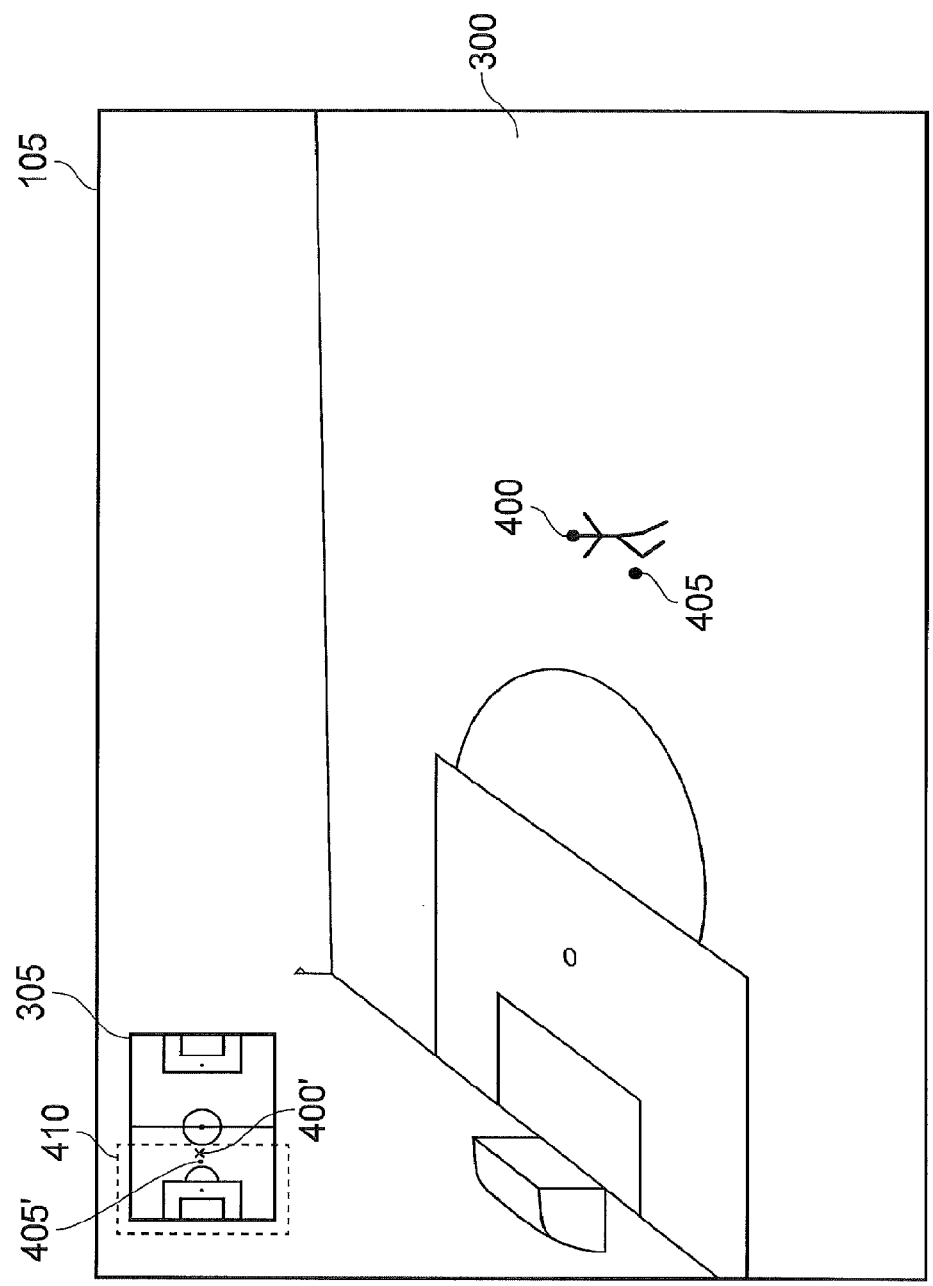

In FIG. 4B a second successive frame from the camera is shown. In this, the player 400 and the ball 405 have moved to a second position within the image 300. Again, the position of the player 400 and the ball 405 is identified in the image 300 using object detection and recognition. The position of the player 400 and the ball 405 is marked on the overhead map 305 as position 400' and 405' respectively. Again the field of view marking 410 is shown on the overhead map 305. Of course, it is envisaged that any metadata could be used that identifies the position of the object on the pitch. In this case, this may be provided externally to the disclosed system. For example, the image could be analysed in a specific object detection and tracking system and the metadata sent to the apparatus. Alternatively, a user could identify the position of the object manually and provide this to the apparatus.

It is noted here that the pan, tilt and zoom parameters of the camera in the camera arrangement 110 is the same in both FIGS. 4A and 4B.

Figure 4C:
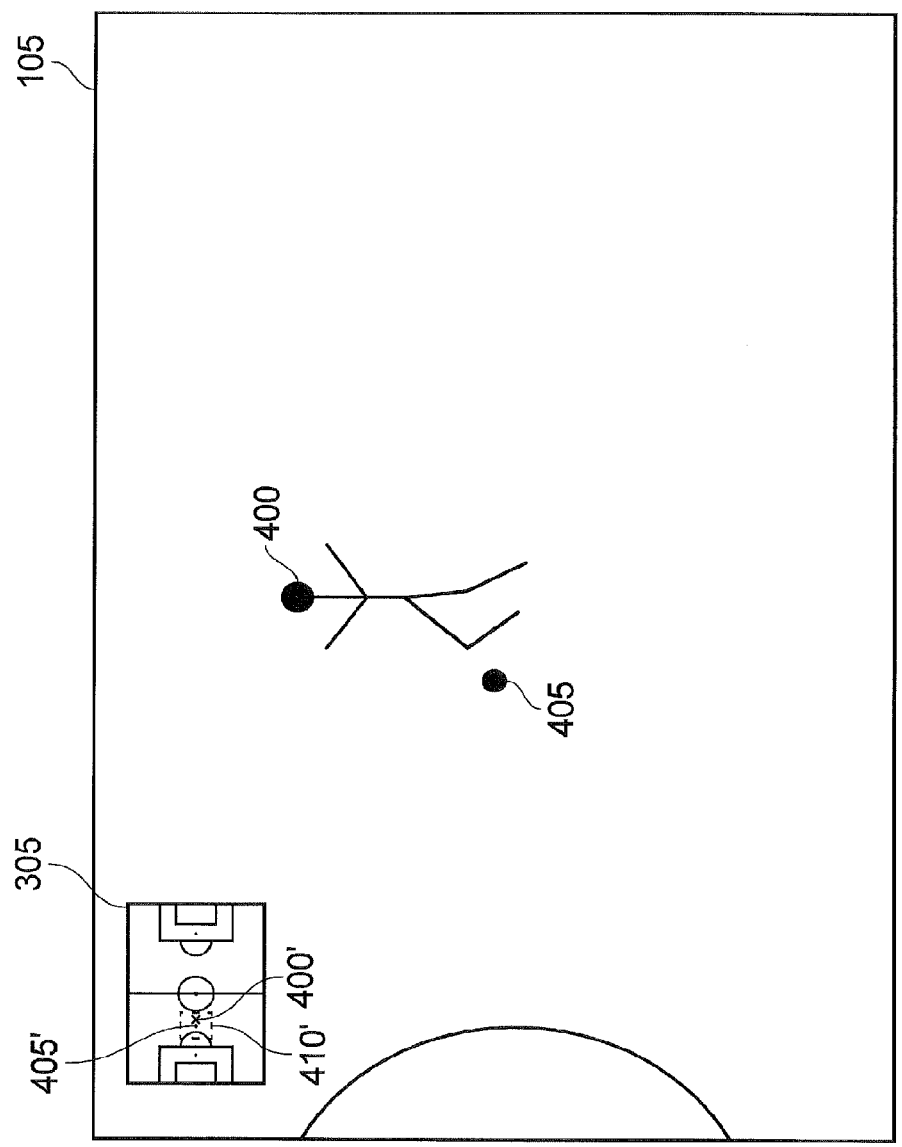

It is possible for the camera in the camera arrangement 110 to zoom in onto the position of the player 400. The effect of this is shown in FIG. 4C. It should be noted here that the zoom using a remote controlled camera as provided in the camera arrangement 110 provides a zoomed image with improved clarity compared with the virtual camera of GB2473059A. This is because the zoomed image in GB2473059A is a digitally zoomed image. However, in embodiments, where the pan, tilt and zoom of a real camera is controlled, the zoom is provided by a lens arrangement and so provides an improved clarity compared with the virtual camera of the prior art.

In order to control the zoom, the position of the player 400 on the virtual plane is determined. This was explained previously. The camera field of view is then determined based on the position of the player 400 on the virtual plane. In other words, the field of view of the camera in the camera arrangement 110 may be determined as being a predetermined shape and size centred on the position of the player 400' on the virtual plane (i.e. the overhead map 305). In one example, the field of view of the camera is a square shape of 50 pixels centred on the position of the player 400'. This is shown as field of view 410' in FIG. 4C. Of course, this example is arbitrary and any size or shape of field of view may be provided. Specifically, the shape of the field of view may be similar to the virtual cut out in GB2473059A. In other words, the shape of the field of view may replicate the field of view that would otherwise be provided by a traditional broadcast camera capturing the action.

After the size and shape of the field of view on the virtual plane has been decided by the processor 201, the processor 201 instructs the camera output unit 220 to send modified pan, tilt and zoom instructions to the camera in the camera arrangement 110. Specifically, the processor 201 sends an instruction to the camera in the camera arrangement 110 to adjust the pan, tilt and zoom parameters to capture the field of view defined on the virtual plane by the field of view 410'.

The camera adjusts the pitch, zoom and yaw as instructed and the output of the camera is shown on the display 105. As can be seen, this shows a close-up of the player 400 and the ball 405. As can be seen in FIG. 4C, the overhead map of the entire real-life scene is shown with the boundary line 410' of the field of view of the camera capturing the player 400 shown. This is overlaid on the image and provides the user of the system with a very quick view of the position of the real-life camera. This is useful as an interface for the user as this assists in determining the field of view of the camera relative to the scene.

Figure 5A:
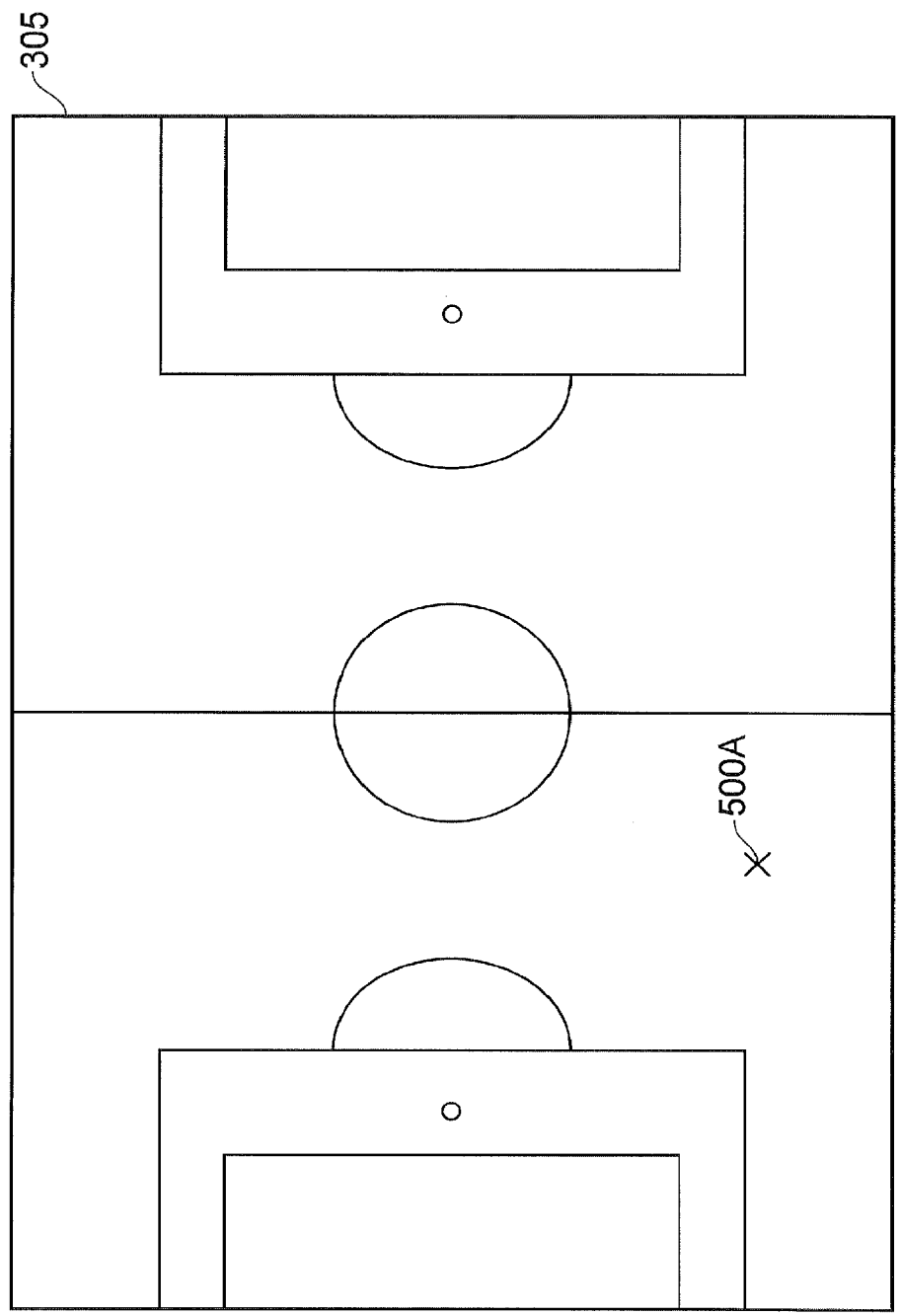
FIGS. 5A to 5D show a position prediction technique according to embodiments of the disclosure.

Although FIG. 4C shows a mechanism by which the camera in the camera arrangement 110 can zoom in on a player using a real camera, in reality, there is a slight time delay in issuing the instruction for the camera in the camera arrangement 110 to change its pan, tilt and zoom and the camera actually performing this change. In a fast moving event like soccer, where the position of the player or ball or object of interest changes rapidly, the delay may result in the output from the camera missing some action. In embodiments, therefore, this problem is addressed. The solution to this is explained with reference to FIG. 5A to FIG. 5D In FIG. 5A, the overhead map 305 is shown. For ease of understanding, the overhead map 305 shows a virtual plane of the soccer pitch captured by the camera in the camera arrangement 110.

Figure 5B:
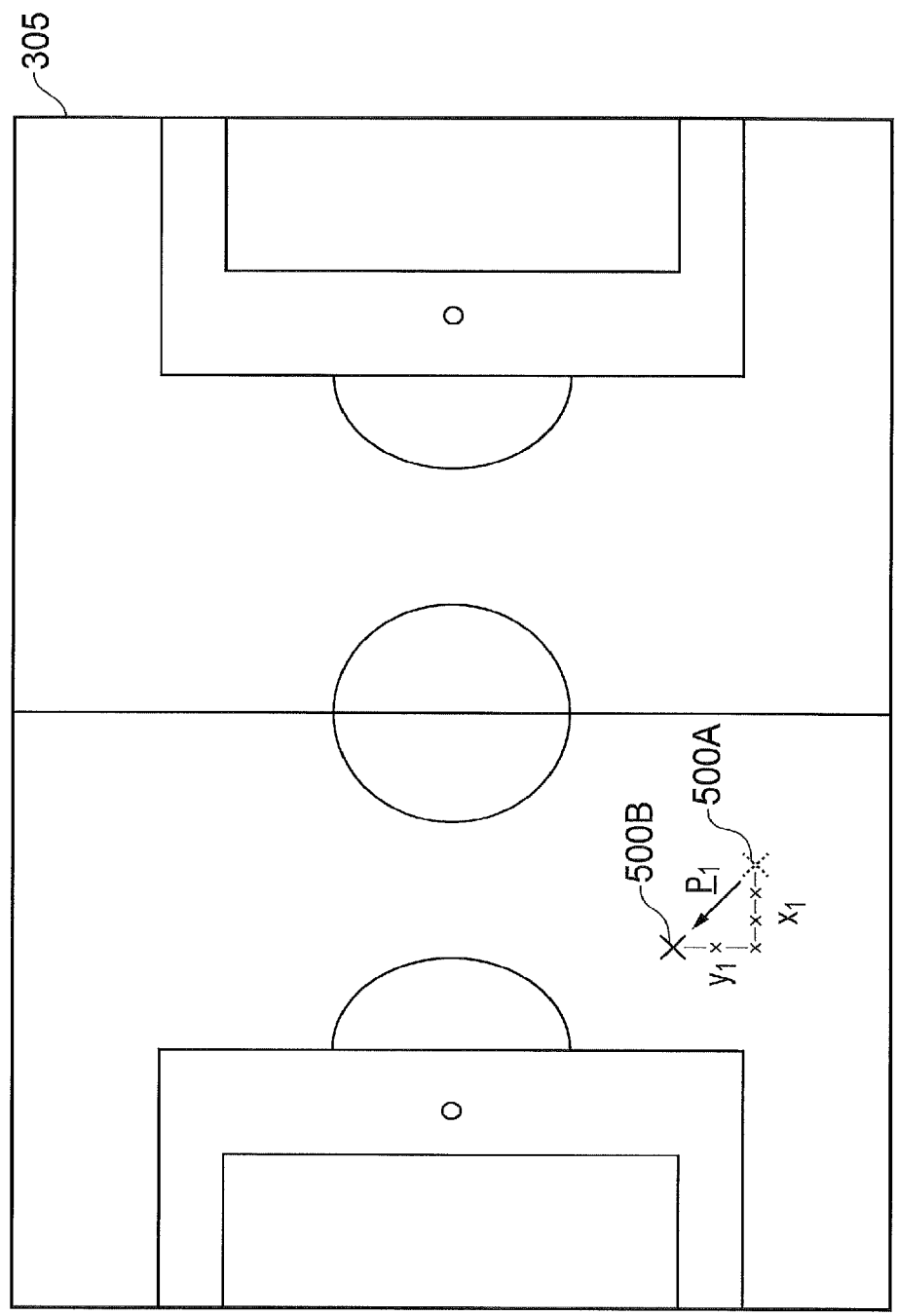
Figure 5C:
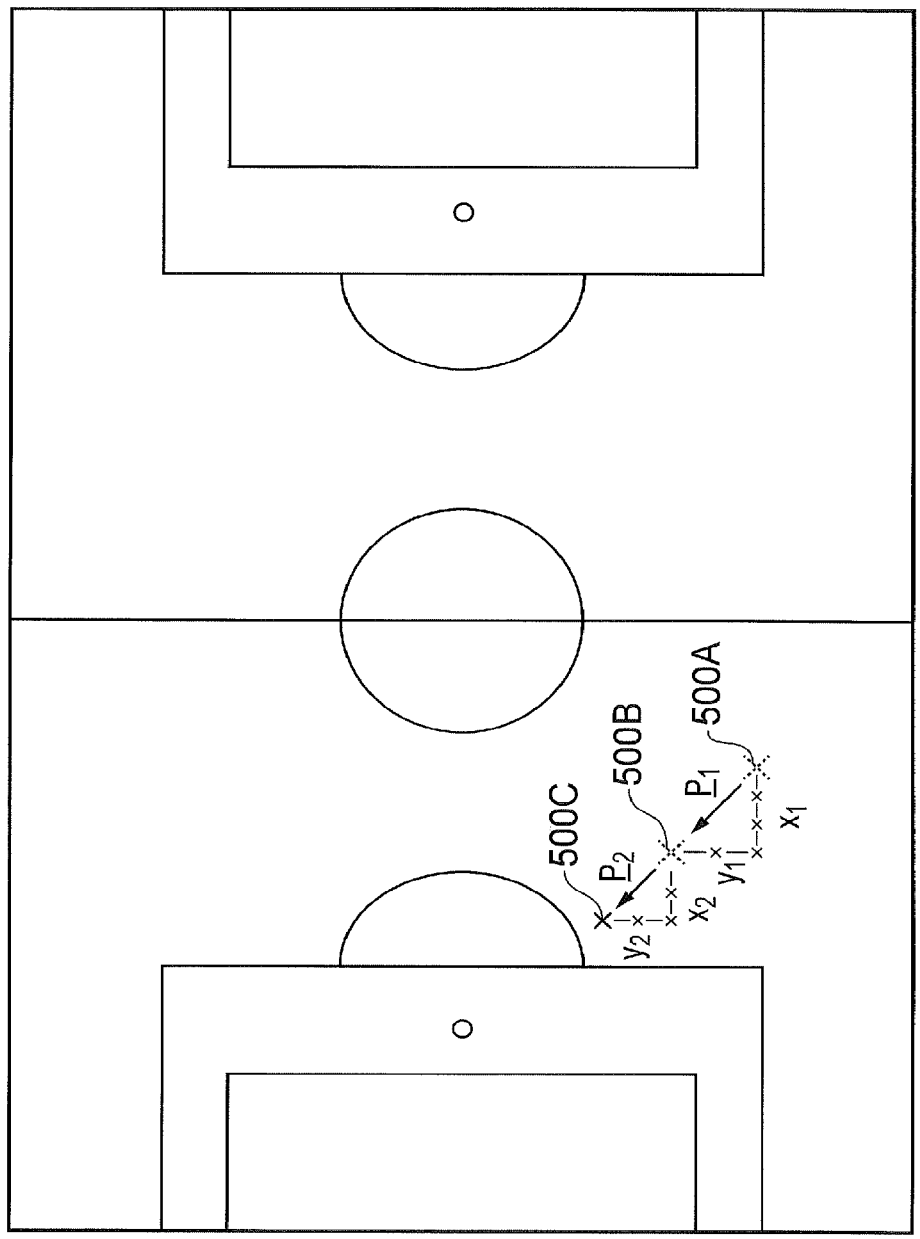

Located on the overhead map 305 is a player located at position 500A. The position 500A of the player is determined from the captured image and transformed to the virtual plane as explained above. FIG. 5B shows the overhead map identifying the new position of the player a predetermined period of time after the overhead map of FIG. 5A was determined. As is seen in FIG. 5B, the player has moved by a vector P1 to position 500B. FIG. 5C shows a new position of the player a predetermined period of time after the overhead map of FIG. 5B was determined. The player, in FIG. 5C has moved by a vector P2 from position 500B to position 500C.

As the player has traveled consistently in a certain direction over a predetermined period of time, it is possible to predict the position of the player a predetermined period of time later. In other words, the average change of position of the player is shown in equation 1.

$$P_{av} = \frac{[P2] - [P1]}{n \times \text{time}} \qquad \text{Equation (1)}$$

Where $P_{av}$ is the average vector change of the position of the player; P2 is the vector position of the player at position 500C; P1 is the vector position of the player at position 500B; n is the number of predetermined periods, which in this case is 2; and time is the period of time of the predetermined period.

The value of $P_{av}$ is used to determine a predicted position a further predetermined period of time later. Specifically, referring to FIG. 5D, the predicted position of the player is position 500D. Position 500D is located a vector $P_{av}$ away from position 500C.

Figure 5D:
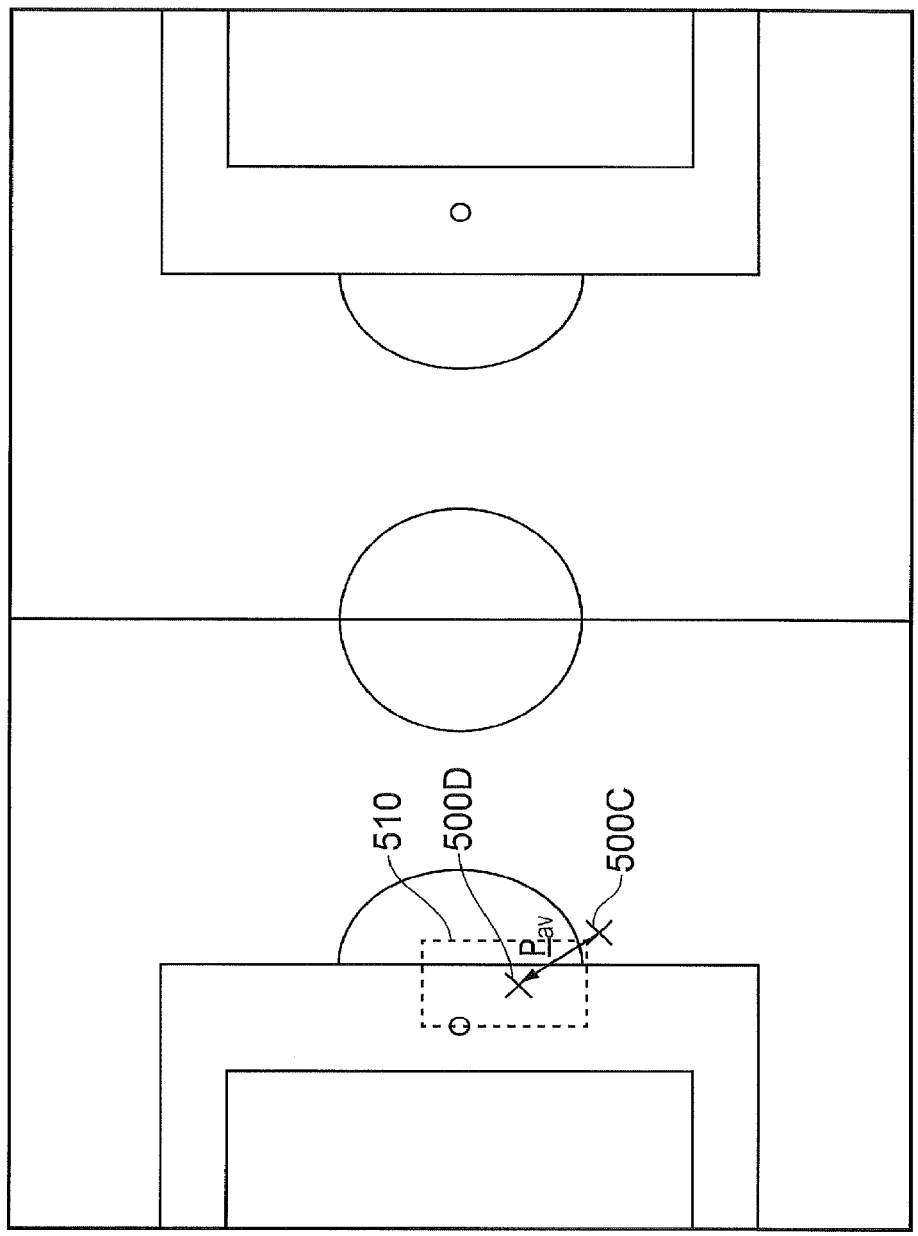

As is seen from FIG. 5D, the camera field of view 510 is centred on position 500D. In other words, the camera field of view 510 is centred on the predicted position of the player rather than the current position of the player.

Of course, the camera field of view 510 is centred on the predicted position of the player on the virtual plane. Using the transformation derived at the calibration step, it is possible to identify the pan, tilt and zoom parameters of the camera in the camera arrangement 110 required to achieve this desired camera field of view 510. These parameters are determined by the processor 201 and sent to the camera output unit 220. The camera output unit 220 sends the parameters to the camera in the camera arrangement 110. The camera uses these parameters to output the appropriate image of the soccer pitch.

By predicting the field of view of the camera, it is possible to compensate for the time taken to correctly position the camera in the camera arrangement 110. In other words, in embodiments, automatic object tracking may be realised using real cameras rather than virtual cameras. This allows for the clarity of the field of view to be improved.

Although the above describes a prediction technique, it is envisaged that the position of the camera will be predicted every frame. This is because it is possible that, in an automated system, if the position of the camera was predicted every frame, the camera in the camera arrangement 110 will move too often. This may lead to an uncomfortable viewing experience for the viewer. Therefore, in order to avoid this situation, it is envisaged that the camera will be moved to the predicted position if the predicted position is a predetermined threshold distance from the current position.

Although the above has describes the predicted position being based on an average movement of a detected object (in this embodiment a player), the disclosure is not limited to this. For example, the prediction could be based on the change in position between any two consecutive frames in sequence of frames. As an example, the difference in position between consecutive frames in the last 20 frames could be determined and a median value of the position differences selected. This could be used to calculate the predicted position. Additionally, in the context of sports where bursts of speed are common, the predicted position may be determined by analysing the acceleration of the detected object over a predetermined number of preceding frames. The predicted position may then be determined in accordance with this acceleration. In other words, the predicted position is based on a constant rate of acceleration of the object.

Moreover, it is envisaged that the field of view of the camera capturing the detected object may be wider when moving to a predicted position. This ensures that any error in the predicted position does not inhibit the viewer from seeing the detected object. This is particularly useful when detecting a fast moving object.

Although the foregoing describes the detected object being either a player or a ball, the disclosure is not so limited. For example, the detected object may include several different objects such as a particular group of players, or the combination of a player (or group of players) and the ball. In this case, the position and the predicted position may be the centre of the group rather than the specific location of the player. Moreover, in this case, the position marked on the overhead map may be different to the predicted position of the camera field of view. Further, the field of view of the camera may be chosen to include each member of the group. Sometimes each different object may be referred to as constituent parts of the overall object; the object being, in this case, the group.

Figure 6:
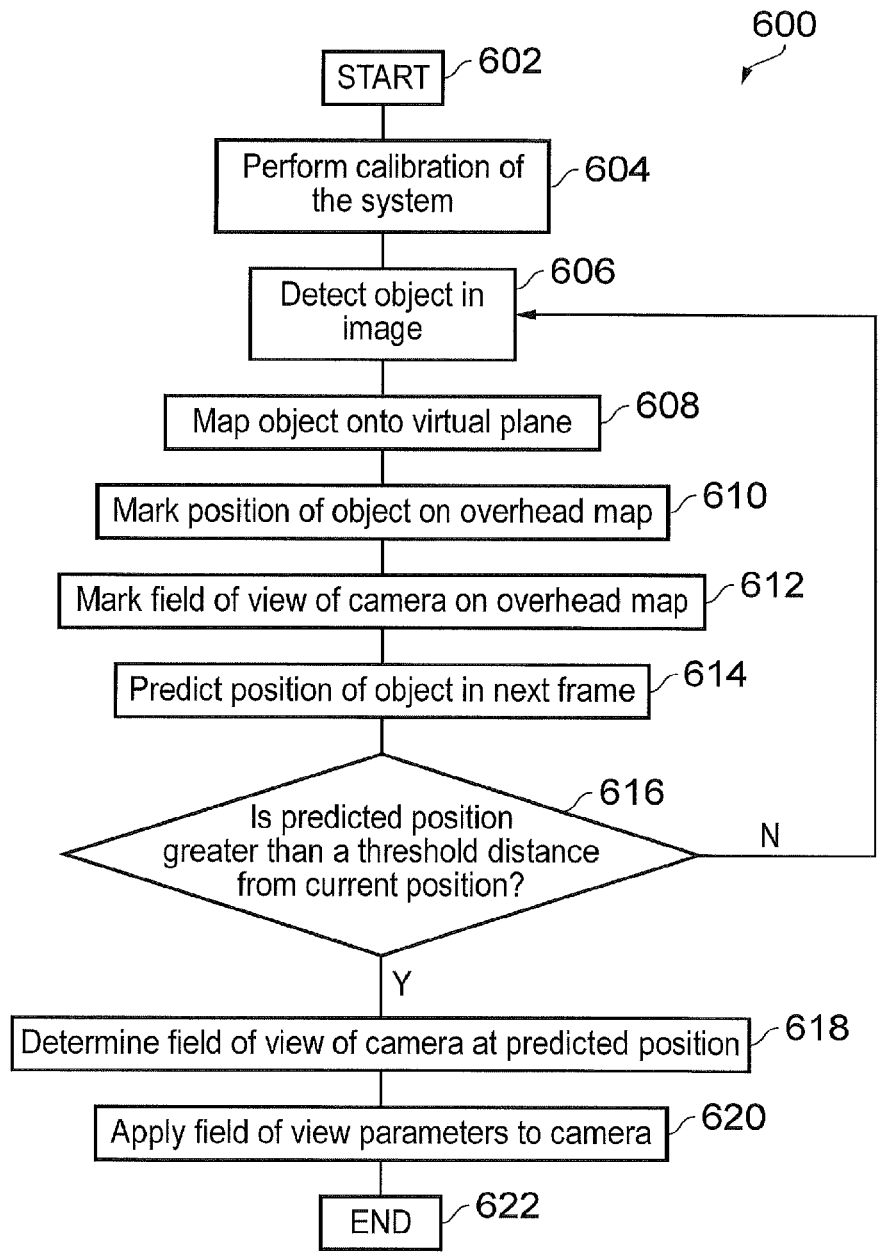
FIG. 6 shows a calibration flowchart according to embodiments of the disclosure.

A flow chart 600 is shown in FIG. 6 explaining the operation of the image processing apparatus of FIG. 2. Typically, it is envisaged that the flow chart will be embodied as computer software. The flow chart starts at step 602. The known calibration process is then carried out at step 604. The position of the desired object (or group of objects) is detected in the image at step 606. The position of the desired object is mapped from the image to the virtual plane in a known manner is step 608. The position of the desired object is marked on the overhead map in step 610. The field of view of the camera in the arrangement is marked on the overhead map in step 612. This can be achieved because the pixel position of the image captured by the camera is known and these pixel positions are translated onto the overhead map.

The predicted position of the object is determined in step 614 according to embodiments of the present disclosure. At point 616, it is determined whether the predicted position is greater than a threshold distance from the current position. If the predicted position is not greater than a threshold, then the "no" path is followed and the process moves to the next frame of video and then starts from step 606. However, if the predicted position is greater than a threshold, the "yes" path is followed and the field of view of the camera is determined at the predicted position. This is step 618. The field of view parameters are then applied to the camera or cameras in the arrangement in step 620. The process then ends at step 622.

Timeline and Presentation Generation

As well as the use of one or more movable cameras for capturing video images of a sporting event (as described above), it is also known from, for example, the system disclosed in patent application GB2473059 (derived from UK patent application GB0915114.3) filed by Sony Corporation, that a non-moving camera (or cameras) may be used to capture a video recording of a sporting event. Such a camera (or cameras) will have a field of view of the scene of the sporting event such that the area of the scene in which the sporting event takes place (for example, a soccer pitch) and all participants of the sporting event (for example, all soccer players) are within the field of view. A problem with such an arrangement, however, is that it can be difficult to analyse specific details of the sporting event. The present disclosure therefore aims to alleviate this problem.

Figure 7:
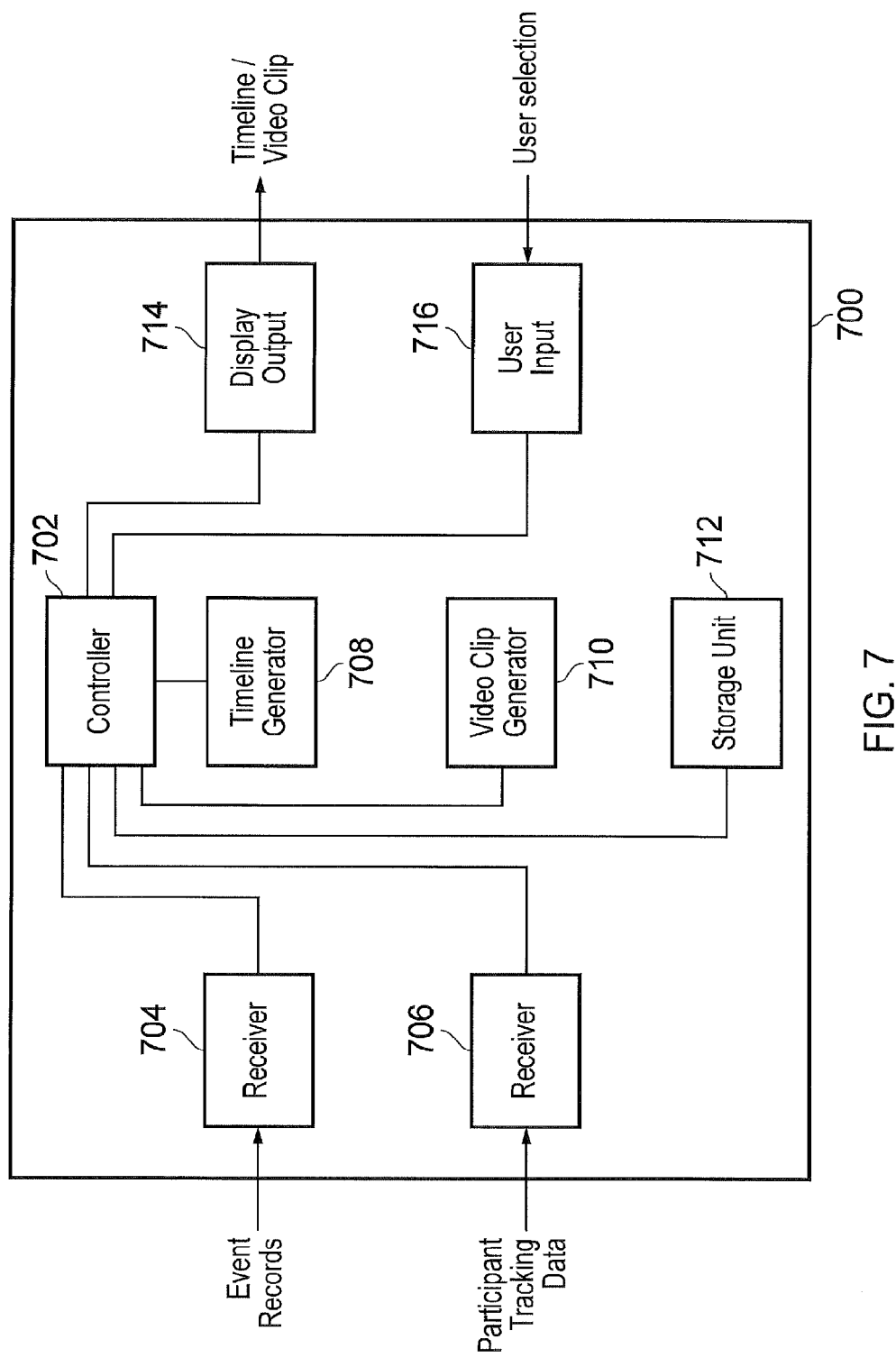
FIG. 7 schematically illustrates an apparatus according to an embodiment of the present disclosure.

FIG. 7 schematically illustrates an apparatus 700 according to an embodiment of the present disclosure. The apparatus 700 comprises a first receiver 704 for receiving event records, a second receiver 706 for receiving participant tracking data, a timeline generator 708, a video clip generator 710, a storage unit 712, a display output element 714 and a user input element 716. Each of these elements is controlled by a controller 702 of the apparatus 700.

The storage unit 712 comprises a video recording of a sporting event such as a soccer match or the like. The video recording is captured with a camera with a field of view of the scene of the sporting event such that the area of the scene in which the sporting event takes place (for example, a soccer pitch) and all participants of the sporting event (for example, all soccer players) are within the field of view. Furthermore, the video recording is continually captured whilst the sporting event is in progress. Thus, the sporting event in its entirety is captured as part of the video recording.

As mentioned above, however, such a view of the sporting event in its entirety can make it difficult to analyse more specific details of the sporting event. The present disclosure therefore aims to alleviate this problem.

In order to help analyse details of the sporting event in the video recording, data is collecting during the sporting event regarding particular events which occur during the sporting event. An example of such data is provided in FIG. 8, which shows data collected at a soccer match.

Each event in FIG. 8 comprises a start time, an end time and an identifier for identifying the event. The combination of the start time, end time and identifier of an event is referred to as an event record. Six event records are shown in FIG. 8. However, this is merely for ease of explanation, and in reality, a soccer match is likely to include many more event records than six.

The first event record 800 has a start time of 00:05:36 (that is, 0 hours, 5 minutes and 36 seconds), an end time of 00:06:14 and an identifier of "Player 1". This indicates that an event involving soccer player "Player 1" occurred between the times 00:05:36 and 00:06:14 of the sporting event (and of the video recording of the sporting event). Note that a clock used to record the start and end time of each event during the sporting event is synchronised with a clock used for recording the elapsed time of the video recording of the sporting event. Thus, an event which is recorded with a start time of 00:05:36 and an end time of 00:06:14 during the sporting event (as is the case with first event record 800) will be replayed in the video recording of the sporting event when the video recording is replayed between times 00:05:36 and 00:06:14.

The second event record 802 has a start time of 00:08:13, an end time of 00:08:43 and an identifier of "Player 2". This indicates that an event involving soccer player "Player 2" occurred between the times 00:08:13 and 00:08:43 of the sporting event (and of the video recording of the sporting event). Similarly, the third event record 804 has a start time of 00:08:20, an end time of 00:08:49 and an identifier of "Player 3". This indicates that an event involving soccer player "Player 3" occurred between the times 00:08:20 and 00:08:49 of the sporting event (and of the video recording of the sporting event).

The fourth event record 806 has a start time of 00:08:10, an end time of 00:08:52 and an identifier of "Free Kick". This indicates that a free kick was awarded to one of the soccer teams between the times 00:08:10 and 00:08:52 of the sporting event (and of the video recording of the sporting event).

The fifth event record 808 has a start time of 00:11:12, an end time of 00:11:13 and an identifier of "Player 2". This indicates that a further event involving soccer player "Player 2" occurred between the times 00:11:12 and 00:11:13 of the sporting event (and of the video recording of the sporting event). This is in addition to the event involving "Player 2" which was recorded as event record 802.

The sixth event record 810 has a start time of 00:10:58, an end time of 00:11:41 and an identifier of "Yellow Card". This indicates that a player of one of the soccer teams was penalised with a yellow card between the times 00:08:10 and 00:08:52 of the sporting event (and of the video recording of the sporting event).

It is noted that each of the events for which there is an event record may have occurred over the same or over an overlapping time period. For example, event records 802, 804 and 806 all occur over respective time periods which overlap. This may occur when the events associate with event records 802, 804 and 806 are linked. For example, there may have been an incident involving "Player 2" and "Player 3" which led to a free kick being awarded. Similarly, event records 808 and 810 each occur over respective time periods which overlap, perhaps indicating that "Player 2" was penalised with a yellow card. As will be explained, an advantage of the present disclosure is that it is easier for a user to navigate through the events recorded for a video recording of a sporting event and to see which events may be linked.

In embodiments, each event record may be recorded live during the sporting event or during an initial playback of the video recording of the sporting event. Furthermore, the event records for each identifier may be recorded by a dedicated observer who focuses solely on a particular participant (soccer player, in this example) or event. For example, a first observer may continually observe "Player 1" and create an event record with the identifier "Player 1" each time there is an event involving "Player 1". A second observer may continually observe the soccer match and create an event record with identifier "Free Kick" whenever a free kick is awarded. Thus, either during the sporting event, or afterwards on the basis of the video recording of the sporting event, a collection of event records is produced.

The event records in the format as shown in FIG. 8 are, however, not very intuitive for analysis by a user. That is, given the list of event records shown in FIG. 8, it is not very easy for a user to navigate through these records in conjunction with the video recording of the sporting event (this may be referred to simply as the video recording) so as to obtain meaningful information about the sporting event. Embodiments of the present disclosure aim to alleviate this problem.

In order to do this, the complete collection of event records associated with the soccer match is received by the first receiver 704 of the apparatus 700. The controller 702 then controls the timeline generator 708 to convert the collection of event records into a timeline and to output the timeline for display on a display device (not shown in FIG. 7) via display output element 714. The timeline is shown in FIG. 9.

Figure 9:
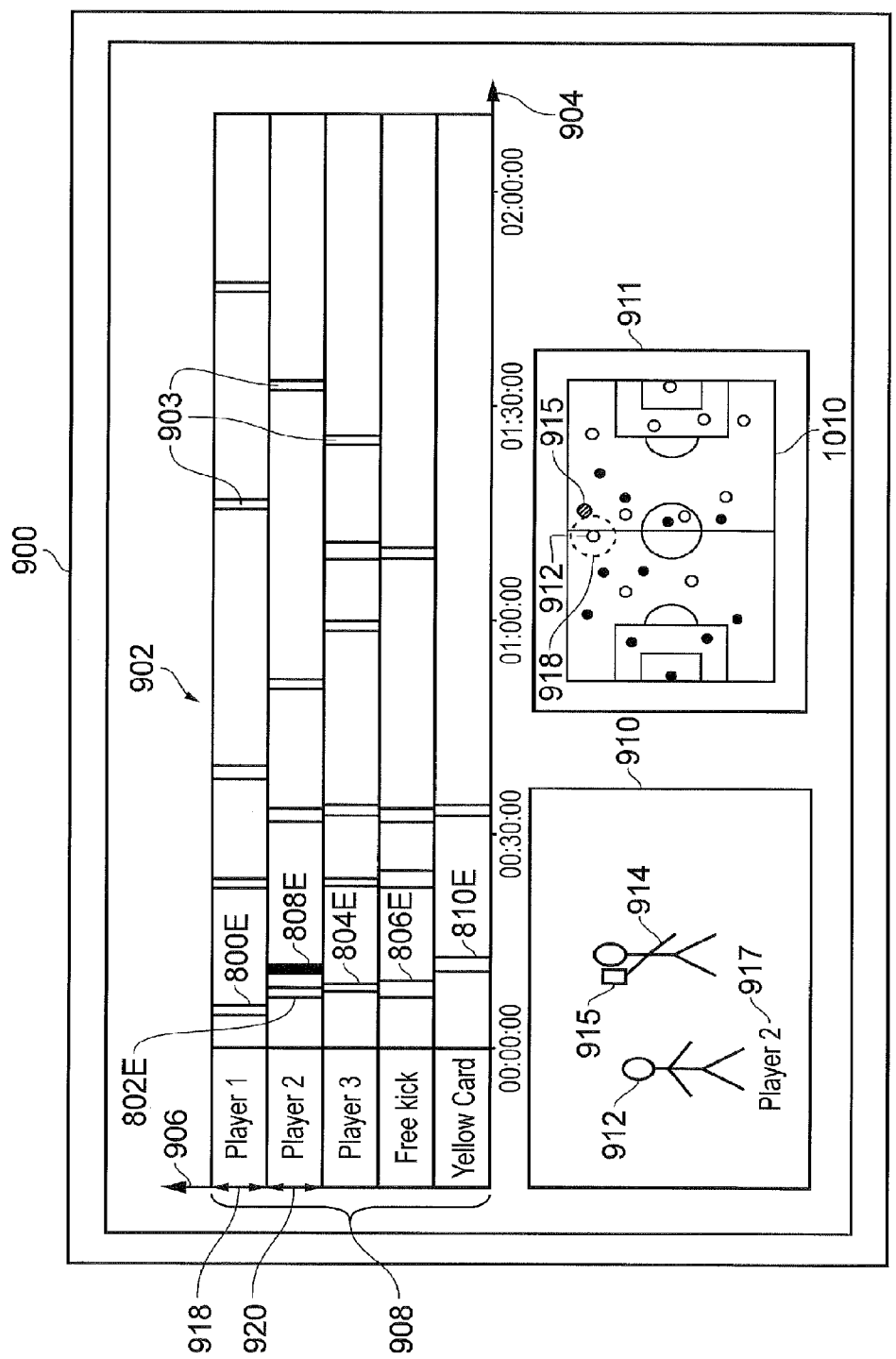
FIG. 9 shows a display device displaying a timeline according to an embodiment of the present disclosure.

FIG. 9 shows a display device 900 (which may be any suitable device for displaying an electronic image, such as a tablet computer, smartphone, laptop or television, for example). The display device 900 displays the timeline 902 generated by the timeline generator 708 and output by the display output element 714.

The timeline 902 comprises a first axis 904 along which the elapsed time of the video recording is indicated and a second axis 906 along which the identifiers 908 of the event records are indicated. The timeline 902 also comprises a plurality of timeline elements 903, each of which corresponds to a respective one of the event records. For example, timeline element 800E corresponds to event record 800 shown in FIG. 8. Similarly, timeline elements 802E, 804E, 806E, 808E and 810E correspond, respectively, to event records 802, 804, 806, 808 and 810 shown in FIG. 8.

Each timeline element extends along a portion of the first axis 904 defined between the start time and end time of its corresponding event record. Thus, for example, timeline element 800E extends along the first axis 904 between the start time 00:05:37 and end time 00:06:14 of corresponding event record 800, timeline element 802E extends along the first axis 904 between the start time 00:08:13 and end time 00:08:43 of corresponding event record 802, etc.

Also, each timeline element extends along a portion of the second axis 906 associated with the identifier of its corresponding event record. Thus, for example, timeline element 800E extends along the second axis 906 along a portion 918 of the second axis 906 associated with identifier "Player 1" of corresponding event record 800, time elements 802E and 808E extent along the second axis 906 along a portion 920 of the second axis 906 associated with the identifier "Player 2" of corresponding event records 802 and 808, etc.

Thus, as shown in FIG. 9, the timeline 902 comprising timeline elements 903 allows the start time, end time and identifier of each event record to be seen in an intuitive manner. In particular, with the timeline 902, event records which may be related can be easily identified, since the timeline elements associated with those event records will appear on the timeline over the same or over an overlapping time period. For example, it can be seen that the timeline elements 802E, 804E and 806E (relating to event records 802, 804 and 806, respectively) all line up on the timeline over an overlapping time period, perhaps indicating that there was an incident involving "Player 2" and "Player 3" which resulted in a free kick being awarded during the soccer game. Similarly, it can be seen that timeline elements 808E and 810E (relating to event records 808 and 810, respectively) each line up on the timeline over an overlapping time period, perhaps indicating that "Player 1" was penalised with a yellow card. The timeline 902 therefore makes it easy and intuitive for a user to identify event records that are potentially linked.

It will be appreciated, however, that even though potential links between event records can be easily established on the basis of the timeline 902, these links cannot be confirmed without reviewing the video recording of the sporting event at the times indicated by the event records of interest. Embodiments of the present disclosure allow the video recording to be reviewed in this regard via an arrangement which is intuitive and convenient for the user.

In order to explain this, it is noted that the video recording is stored as an electronic video file in the storage unit 712. The storage unit 712 may be any suitable storage unit such as semi-conductor storage, magnetic storage or optical storage. The video recording comprises a plurality of electronic images (or frames) which are successively displayed at a predetermined frame rate during playback of the video recording, as is well known in the art. Each of the frames may be captured from a single camera (such as a high definition or 4K camera) or may be formed from stitching together two or more high definition or 4K images. An example of an image stitching system is found in patent application GB2473059 (derived from UK patent application GB0915114.3) filed by Sony Corporation. As already mentioned, each frame of the video recording has a field of view of the scene of the sporting event such that the area of the scene in which the sporting event takes place (for example, a soccer pitch) and all participants of the sporting event (for example, all soccer players) are within the field of view. The video recording may therefore be referred to as a full view video recording.

A cut-out (or virtual camera view) of the video frames can be created which mimics the output of a broadcast video camera capturing the image in real-time. That is, a cut-out, which is a zoomed-in and perspective-corrected portion of each video frame, is created, and the portion of each video frame which is defined by the cut-out is fed at the predetermined frame rate to a device such as a smartphone, tablet or television for viewing by the user. The image viewed on this device mimics that which would have been captured by a real camera with a yaw, pitch and zoom adjusted so as to capture a portion of the scene of the sporting event which has been captured in full in the video recording. An example of this type of system is found in patent application GB2512621A (derived from UK patent application GB13060.50.4) filed by Sony Corporation. In an alternative embodiment, however, the cut-out may be a zoomed-in portion of each video frame without perspective correction.

The video clip generator 710 is configured to generate a cut-out of the video recording and to output this cut-out for display via the display output element 714. The cut-out is generated on the basis of participant tracking data received by the second receiver 706 and a selection of one or more timeline elements 903 by a user of the apparatus 700, as described below.

The participant tracking data indicates a position of each participant of the sporting event for which there is at least one corresponding event record at a plurality of times during the elapsed time of the video recording of the sporting event. Each position of each participant is recorded in a way such that it can be mapped to a particular yaw, pitch and zoom of the virtual camera used by the video clip generator 710 to generate the cut-out so that the output cut-out image at that yaw, pitch and zoom includes the relevant participant. An example of participant tracking data for "Player 1" is shown in FIG. 10.

Figure 10:
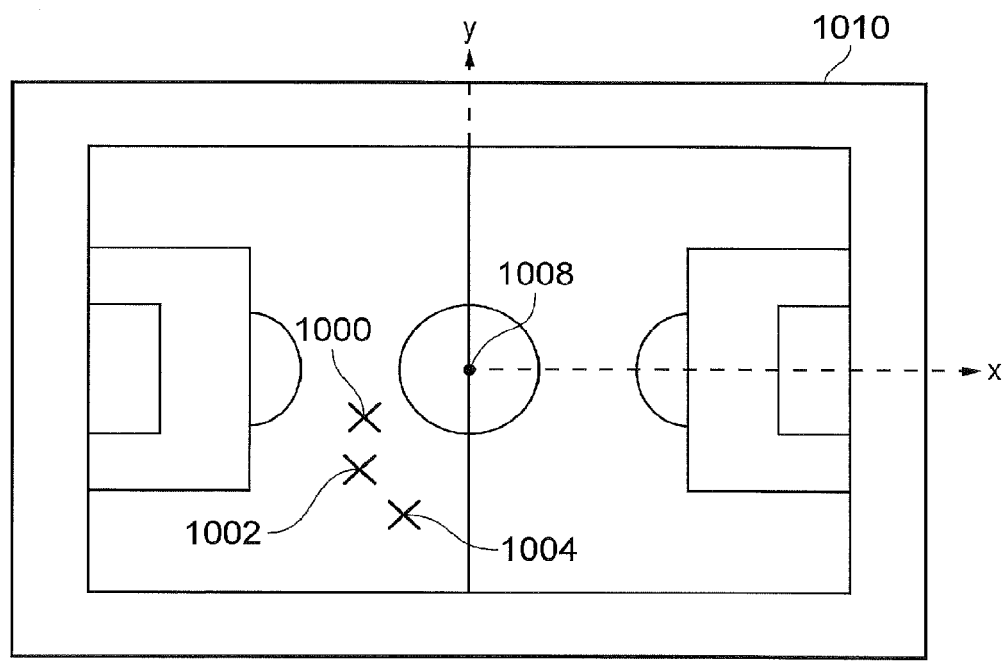
FIG. 10 shows an example of participant tracking data according to an embodiment of the present disclosure.

It can be seen in FIG. 10 that the participant tracking data for "Player 1" includes a horizontal ("x") position of the player along a first dimension of the soccer pitch and a vertical ("y") position of the player along a second dimension of the soccer pitch at each of a number of times. The "x" and "y" positions therefore form a two dimensional coordinate system relative to the soccer pitch, which is an example of a surface on which a sporting event is carried out.

In this example, for simplicity of explanation, the (x, y) position of "Player 1" is recorded once every second during the video recording. Thus, at time 00:00:01, "Player 1"

position 1000 is recorded as (−16 m, −2 m), at time 00:00:02, "Player 1" position 1002 is recorded as (−16 m, −3 m) and at time 00:00:03, "Player 1" position 1004 is recorded as (−15 m, −4 m). The (x, y) position of "Player 1" is recorded after every further one second interval throughout the duration of the video recording. However, it will be appreciated that the (x, y) position of "Player 1" (as the participant of the sporting event) could be recorded at a different interval (such as every ⅟₁₅th, ⅟₃₀th or ⅟₆₀th of a second, for example). In one embodiment, the position of each participant of the sporting event is recorded for each frame of the video recording. Note that, as with the start and end time of each recorded event during the sporting event (as shown in FIG. 8), a clock used to record the time at each recorded participant position is synchronised with a clock used for recording the elapsed time of the video recording.

In this example, each x position and y position is recorded in meters (m) with respect to the centre 1008 of the soccer pitch 1010, the centre 1008 forming the origin of the (x, y) coordinate system within which the position of "Player 1" is recorded. The "Player 1" positions 1000, 1002 and 1004 are illustrated on the soccer pitch 1010 in FIG. 10. Tracking and recording the (x, y) position of a soccer player on a soccer pitch as shown in FIG. 10 may be carried out using any method known in the art.

At each recorded position of "Player 1", the yaw, pitch and zoom of the virtual camera used by the video clip generator 710 to generate the cut-out may be adjusted on the basis of a mapping between the pitch coordinates (x, y) and the yaw, pitch and zoom so that "Player 1" is featured in the output cut-out image. Such a mapping may be carried out on the basis of any suitable technique known in the art. For example, the same technique as described above for the determination of the pan (yaw), pitch (tilt) and zoom of a real camera in response to the determination of the (x, y) position of a player on a soccer pitch can be used (although this time, of course, it is the yaw, pitch and zoom of a virtual camera which is determined). As mentioned above, the cut-out image is a zoomed-in, perspective corrected portion of the frames of the video recording, and thus produces an image which mimics that of a real camera following "Player 1".

It will be appreciated that, for a general sporting event, any method of periodically recording the position of participants of the sporting event can be used to generate a suitable cut-out image of a particular participant from a full view video recording of the sporting event. The requirement is that the recorded position can be mapped to a suitable yaw, pitch and zoom of the virtual camera so as to allow the participant of interest to be featured in the output cut-out image.

In embodiments of the present disclosure, the timeline elements 903 are selectable by a user via the user input element 716 so as to produce a video clip 910 generated from the video recording. Advantageously, this allows a user not only to view the occurrence of events using the timeline 902, but also to investigate in detail the events which have taken place and to, for example, confirm whether event records which occur over the same or over overlapping time periods (or even non-overlapping time periods in temporal proximity to each other) are indeed linked. The user input element 716 is any suitable element or device which allows a user to select a timeline element 903 displayed on the display device 900. For example, the user input element 716 may comprise a keyboard, mouse, trackpad, touchscreen or the like.

In FIG. 9, it can be seen that the timeline element 808E has been selected by the user. In response to the selection of the timeline element 808E by the user, the timeline generator 708 causes the timeline element 808E to be shown in a different colour than that of the non-selected timeline elements. The timeline element 808E is shown in a darker shade than the non-selected timeline elements in FIG. 9. By selecting the timeline element 808E, the video clip generator 710 generates a video clip 910 featuring "Player 2", "Player 2" being the identifier of the event record 808 associated with timeline element 808E.

The video clip 910 is generated on the basis of the start and end times of the event record 808 corresponding to timeline element 808E and a cut-out generated on the basis of each of the positions of "Player 2" during the time period between the start and end times of the event record 808. The positions of "Player 2" during the time period between the start and end times of the event record 808 are known from the participant tracking data for "Player 2".

Thus, in this example, upon selection of the timeline element 808E, the video clip generator 710 forms a first cut-out based on the recorded position of "Player 2" at the start time 00:11:12 of event record 808. The video clip 910 is then displayed as the first cut-out at the predetermined frame rate of the video recording until the time of the next recorded position of "Player 2" is reached, in which case the video clip generator 710 forms a second cut-out based on this next recorded position of "Player 2". The video clip is then displayed as the second cut-out at the predetermined frame rate of the video recording until the time of the next recorded position of "Player 2". This continues until the end time of event record 808.

Figure 11:
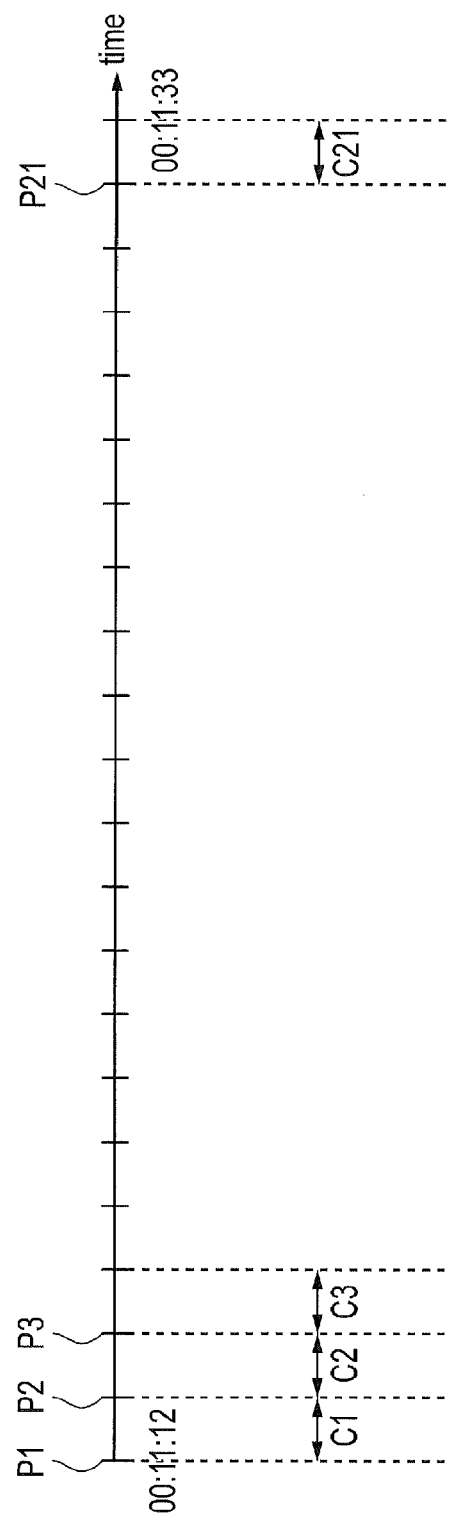
FIG. 11 shows a temporal relationship between participant position and cut-out selection according to an embodiment of the present disclosure.

This is illustrated in FIG. 11, in which, for simplicity, the position of "Player 2" between start time 00:11:12 and end time 00:11:33 is shown to be recorded every one second. At the start time 00:11:12, the position of "Player 2" is determined to be P1 and therefore the video clip is displayed as a cut-out C1 of the video recording generated on the basis of P1. One second later, at time 00:11:13, the position of "Player 2" is determined to be P2 and therefore the video clip is displayed as a cut-out C2 of the video recording generated on the basis of P2. One second later, at time 00:11:14, the position of "Player 2" is determined to be P3 and therefore the video clip is displayed as a cut-out C3 of the video recording generated on the basis of P3. The generation of the video clip then continues on this basis until the time 00:11:33 is reached, which marks the end of the video clip. The final cut-out displayed is (to continue with one second interval naming convention) cut-out C21 which is generated on the basis of "Player 2" position P22.

It will be appreciated that, in some embodiments, the starting point of an event record associated with a selected timeline element may not exactly coincide with the time of a participant position record. For example, the event record timing may be recorded more accurately and therefore the start time may be, for example, 00:11:12:13 (that is, 0 hours, 11 minutes, 12 seconds and 13 hundredths of a second) where as the position of "Player 2" may have only been recorded at, for example, 00:11:12:00 and 00:11:12:25. In this case, the most recent position of "Player 2" (that is, 00:11:12:00) may be used for generation of the cut-out at the start time. However, it will be appreciated that if the start and end times of an event are made to align with frames of the video recording, and if the position of "Player 2" (as a participant of the sporting event) is recorded for each frame of the video recording, then this problem will not arise. That is, the position of "Player 2" for the cut-out at the start time of the event record will be the position of "Player 2" in the frame of the video recording at the start time of the event record.

FIG. 9 shows the video clip 910 generated by the video clip generator 710. The video clip reveals that "Player 2" 912 has been penalised with a yellow card 915 by referee 914. This confirms to the user that the time overlap of the "Player 2" event record 808 and the "Yellow Card" event record 810 as identified by the relative positions of the corresponding timeline elements 808E and 810E on the timeline 902 was indicative of a true link of the events. The position of "Player 2" is indicated in the video clip by electronic identifier graphic 917.

In addition to the video clip 910, the video clip generator 710 also generates and outputs for display via the display output 714 an image of a plan view 911 of the soccer pitch 1010 in which the position of each of the soccer players is indicated. In this case, each soccer player is identified as either a white or black circle, the white or black colour indicating the soccer team to which the player belongs. Furthermore, the referee 915 of the soccer match is identified as a hashed circle. It will be appreciated that any shapes and/or colours may be used to indicate the soccer players and referee, to differentiate the soccer players belonging to different teams, and to differentiate the referee from the soccer players. The position of each player is identified on the basis of the participant tracking data for each player recorded between the start time and the end time of the event record associated with the selected timeline element 808E. In the plan view image 911, it can be seen that "Player 2" 912 is highlighted with an electronic highlight graphic 918 added by the video clip generator 710 (this may be added using video graphics techniques known in the art). This complements the electronic identifier graphic 917 in allowing the user to easily identify the position of "Player 2".

It is noted that, in other embodiments, the electronic identifier graphic 917 may be, for example, a ring drawn around the feet of "Player 2" rather than the name "Player 2" as shown in FIG. 9. This provides improved consistency between the electronic highlight graphic 918 (which identifies the position of "Player 2" in the play view image 911) and the electronic identifier graphic 917 (which identifies the position of "Player 2" in the video clip 910). It is also noted that the position of the electronic identifier graphic 917 in the video clip is generated on the basis of a mapping between each (x, y) coordinate of the soccer pitch in the plan view image 911 and a corresponding position of that coordinate on the portion of the soccer pitch shown in video clip 910 (this mapping being carried out using any suitable mapping technique on the basis of, for example, the yaw, pitch and zoom of the virtual camera). It will also be appreciated that other graphics could be added to both the video clip 910 and plan view image 911 using this mapping, so that when a graphic is drawn on the soccer pitch in video clip 910 a corresponding image will appear on the soccer pitch in the plan view image 911 (and vice versa). Further graphics could include arrows, shapes, etc. to help with sports coaching, for example, and can be added during an initial review of video clips using the timeline 902 or later on video clips saved for producing a presentation (see below).

When the timeline element 808E is selected, the video clip 910 and plan view image 911 are generated by the video clip generator 710 in the way described above and are played back as video images on the display device 900 between the start and ends times of the event record 808 associated with the selected timeline element 808. Thus, two separate views of the sporting event between the start and end times of the event record 808 are shown, one being the video clip 910 generated on the basis of successive cut-outs of the video recording so as to mimic a real camera following "Player 2" and the other being the plan view image 911 which allows the position of "Player 2" on the soccer pitch (and relative to the other soccer players) to be tracked. Thus, once a user has selected a particular timeline element 903, they are advantageously presented with a plurality of views by which to analyse the sporting event.

As will be explained with reference to FIGS. 13A-D, in addition to the cut-out image 910 and plan view image 911, it will be appreciated that further images could also be generated on the basis of the start and end times of the event record corresponding to the selected timeline element and/or the position of a participant identified by the event record. For example, the sporting event may have been captured by more than one camera, with each camera having a different field of view of the sporting event. Thus, there will be a plurality of video recordings, each from a different camera. In this case, a cut-out may be generated in the way described above for each of the video recordings, and thus a plurality of cut-out video clips of the participant identified by the selected event record may be produced. In this case, each cut-out video clip would appear to follow the participant from a different camera angle, thus providing the user with a multi-angled view of the participant concerned and allowing a full and detailed analysis of recorded events. In the case of multiple cut-out video clips, each video clip may be output for display simultaneously by the video clip generator 710 in a similar way to that in which the video clip 910 and plan view image 911 are simultaneously displayed in FIG. 9. Alternatively, each video clip may be displayed one at a time in response to selection via a suitable menu system or the like (as shown in FIGS. 13A-D).

Figure 12:
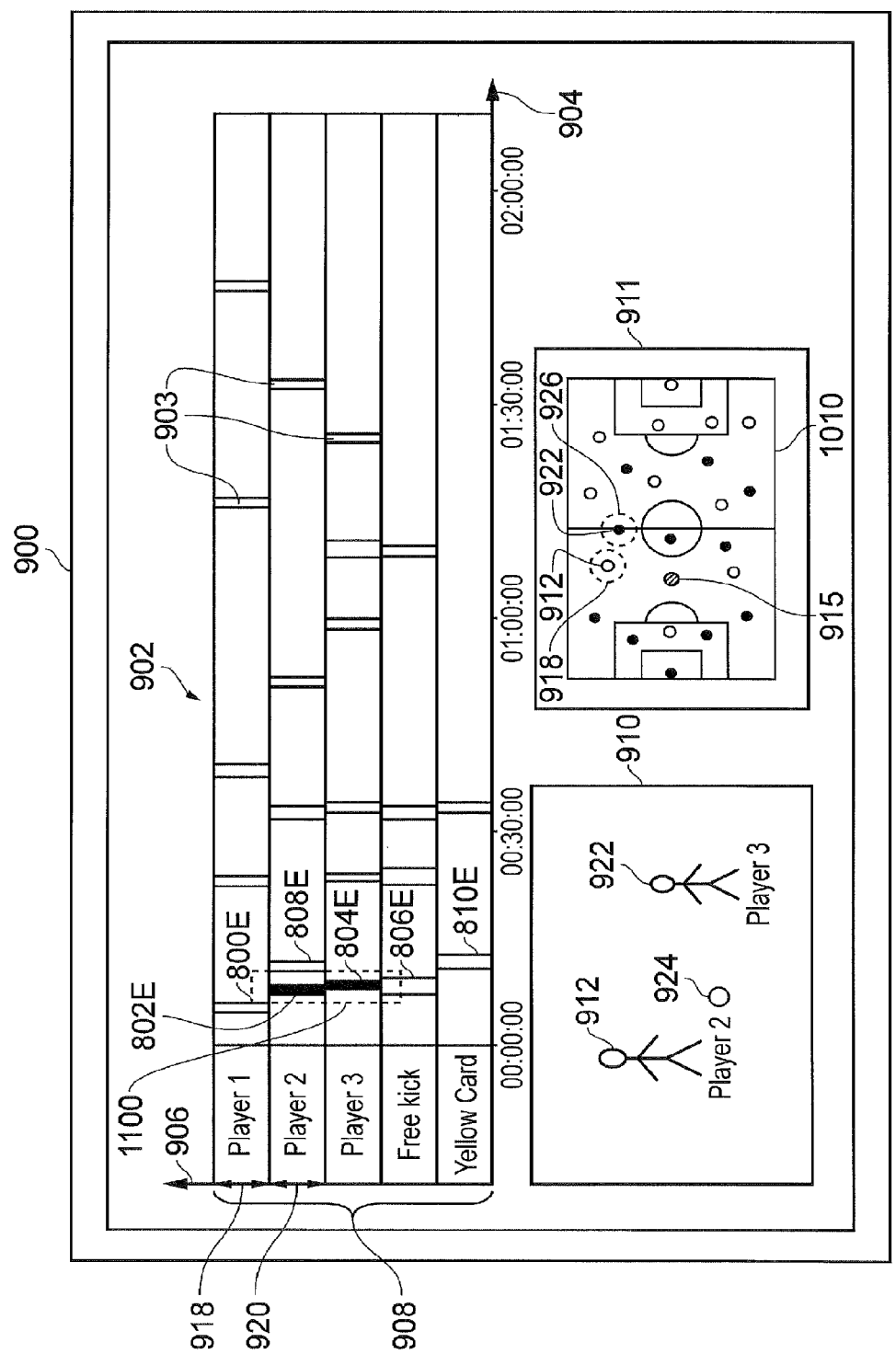
FIG. 12 shows a display device displaying a timeline according to an embodiment of the present disclosure in which a plurality of timeline elements have been simultaneously selected.

In the described embodiments, a user selects one of the timeline elements 903 displayed on the timeline 902. However, in another embodiment, a user may simultaneously select a plurality of timeline elements 903. This is illustrated in FIG. 12, in which the user has simultaneously selected timeline elements 802E and 804E (corresponding to event records 802 and 804, respectively). The user may select a plurality of timeline elements 903 by, for example, individually clicking (when the user input element 716 comprises a mouse, for example) or touching (when the user input element 716 comprises a touch screen, for example) each timeline element they wish to select. Alternatively, as shown in FIG. 12 for the selection of timeline elements 802E and 804E, the user may drag a box 1100 around the timeline elements they wish to select (again, using a dragging action with a mouse or with a touch screen).

When a plurality of timeline elements 903 have been selected, the video clip generator 710 generates the video clip 910 on the basis of the earliest start time of the event records corresponding to the selected timeline elements, the latest end time of the event records corresponding to the selected timeline elements, and the positions of each of the participants identified by the event records corresponding to the selected timeline elements (based on the participant tracking data for these participants). In particular, cut-outs of the video recording are generated based on a yaw, pitch and zoom of the virtual camera which allows all identified participants to be featured in each cut-out image. It is noted that, in some embodiments, the cut-out image associated with a single participant (following selection of a single timeline element, for example) may be expanded so as to include other participants (for which there is participant position data) manually by the user. For example, the user may be able to manually select participants to be included in the cut-out using a suitable menu system or the like (not shown).

In the example of FIG. 12, timeline elements 802E and 804E have been simultaneously selected. Thus, the video clip 910 is generated from the earliest start time of the corresponding event records 802 and 804 (this being 00:08:13, the start time of event record 802) to the latest end time of the corresponding event records (this being 00:08:49, the end time of event record 804). Furthermore, the yaw, pitch and zoom of the virtual camera is adjusted so that both "Player 2" (this being the participant identified by event record 802) and "Player 3" (this being the participant identified by event record 804) are featured in the cut-out images which form the video clip 910. Thus, in the video clip 910 in FIG. 12, both "Player 2" 912 and "Player 3" 922 are featured. In this case, it can be seen that both "Player 2" and "Player 3" are involved in a free kick (as indicated by the fact that the "Free Kick" event record 806 has a time overlap with the event record 802 for "Player 2" and the event record 804 for "Player 3") and that the soccer ball 924 featured in the video clip 910 is therefore stationary prior to being kicked. The plan view image 911 also indicates the respective positions of "Player 2" 912 and "Player 3" 922, with "Player 2" highlighted with highlight graphic 918 and "Player 3" highlighted with highlight graphic 926. Advantageously, this allows events involving multiple participants to be easily reviewed and analysed from the video recording of the sporting event.

It is noted that not all event records are suitable for generating a cut-out because they may not necessarily be associated with participant tracking data. In particular, this applies to event records which are not identified with a particular participant of the sporting event (for which there is the participant tracking data) but which are rather identified with an event such as a yellow card or free kick. For example, although, in some embodiments, when a player is penalised with a yellow card (thus resulting in a "Yellow Card" event record such as event record 810 being recorded), the (x, y) position on the soccer pitch 1010 at which the yellow card was held up by the referee may be recorded as tracking data, in other embodiments, there may be no tracking data (and therefore no position) associated with the yellow card. The same is true for when a free kick is awarded (thus resulting in a "Free Kick" event record such as event record 806 being recorded). In this case, it is not possible to automatically generate a cut-out from the video recording, since there is no position to be mapped to a corresponding yaw, pitch and zoom of the virtual camera.

Thus, following selection of a timeline element corresponding to an event record with an identifier for which there is no tracking data, the video clip 910 is generated between the start and end times of the event record but no cut-out is automatically generated. The video clip 910 therefore has the same full field of view as the original video recording. It is noted, however, that a cut-out of video clip 910 may still be generated manually by the user as the video clip 910 is played back. Manual generation of a cut-out is controlled via the user input element 716 in combination with a suitable user interface for allowing manual control of the virtual camera yaw, pitch and zoom. For example, the user may touch or click on a position of the soccer pitch 1010 shown in the plan view image 911, and the virtual camera yaw, pitch and zoom may be changed in response to the selection of this position (using the mapping between pitch position and camera yaw, pitch and zoom already discussed) so that the video clip shows a cut-out of the video recording. Thus, advantageously, even though a cut-out is not automatically generated (as occurs when a timeline element corresponding to an event record which identifies a participant is selected), a cut-out may still be manually generated by the user so as to allow the user to review and analyse the video clip 910 in more detail.

Although the above-described embodiments relate to generating cut-outs from a full view video recording of the sporting event, in other embodiments, one or more cameras each with a different respective view of the sporting event may be used instead of or in addition to the cameras used for capturing the full view of the sporting event. The view of the sporting event from each of these cameras may be a full view of the sporting event, or may instead be a partial view in which only a portion of the area of the scene in which the sporting event takes place (for example, a soccer pitch) and/or apportion of the participants of the sporting event (for example, all soccer players) are within the field of view. Any video recording camera view may be used as long as a mapping between positions of participants of the sporting event (e.g. (x, y) coordinates of a soccer pitch) and a yaw, pitch and zoom of the virtual camera for generating suitable cut-outs of the video recording can be established (as mentioned above). In embodiments, each camera used to capture a sporting event (whether with a full view or a partial view) will generate its own respective video recording of the sporting event which is stored in the storage unit 712.

FIGS. 13A-D schematically illustrate a further embodiment of the present disclosure in which a timeline may be generated and viewed for each of a plurality of video recordings of a sporting event captured from different cameras. In addition, a plurality of different video recordings may be generated and saved as part of a presentation which may be played back. These video recordings may be video recordings of the same sporting event captured by different cameras and/or video recordings of different sporting events, as will be explained. The presentation is generated by the controller 702 on the basis of output from the video clip generator 710 and saved in the storage unit 712. Each of FIGS. 13A-D show an interactive screen of the display device 900, each interactive screen being generated by the controller 702 on the basis of output from the timeline generator 708 and video clip generator 710 and being output by the display output element 714.

Figure 13A:
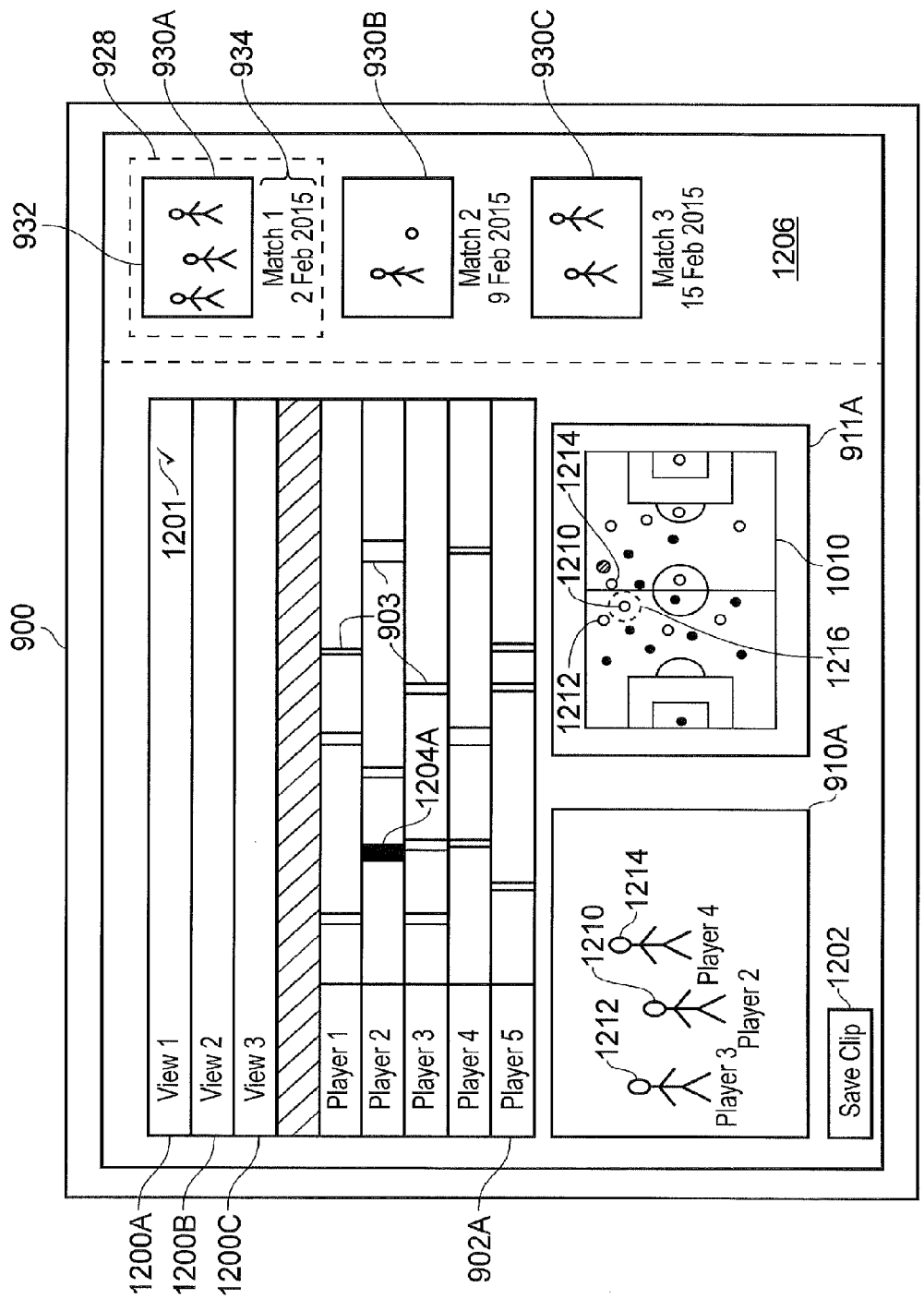
FIGS. 13A to 13D show a further embodiment of the present disclosure in which video clips from a plurality of different video recordings of sporting events may be generated and saved as part of a presentation.

FIG. 13A shows a first interactive screen. Three selectable bars 1200A, 1200B and 1200C are displayed, each representative of a video recording of the same sporting event captured from a different field of view. The three selectable bars 1200A, 1200B and 1200C thus form a list of different video recordings of a sporting event captured from a different field of view. In this example, each selectable bar is representative of a different camera view of a first soccer match ("Match 1"), with bar 1200A being representative of a first camera view ("View 1"), bar 1200B being representative of a second camera view ("View 2") and bar 1200C being representative of a third camera view ("View 3"). Each of the bars is selectable by the user (for example, the user may click or touch a bar in order to select it). In FIG. 13A, "View 1" has been selected by the user, as indicated by electronic identifier 1201. A timeline 902A relating to "Match 1" is generated and displayed. The timeline 902A is generated based on event records for "Match 1" received at the first receiver 704 in the way previously described.

The timeline 902A includes timeline elements 903 as previously described. In the example of FIG. 13A, the user has selected timeline element 1204A, which corresponds to an event record which identifies participant "Player 2". A first video clip 910A is therefore generated from the video recording associated with "View 1" on the basis of this selection in the way previously described. In particular, the first video clip 910A comprises cut-outs of "Player 2" derived from the video recording taken with first camera view "View 1" on the basis of participant tracking data of "Player 2" in "Match 1" received at the second receiver 706. The first video clip 910A temporally extends between the start time and end time of the event record associated with the selected timeline element 1204A. "Player 2" 1210 can be seen in the first video clip 910A of FIG. 13A, together with "Player 3" 1212 and "Player 4" 1214 ("Player 3" and "Player 4" happen to be featured in the virtual camera view forming the cut-out of "Player 2" in the video recording associated with "View 1" in this case). The position of "Player 2" 1210 is also indicated, on the basis of the participant tracking data of "Match 1", on the plan view image 911A of the soccer pitch 1010. The positions of "Player 3" 1212 and "Player 4" 1214 can also be seen. The position of "Player 2" is highlighted with a highlight graphic 1216, as previously described.

With timeline element 1204A still selected, the user may then select bar 1200B corresponding to second camera view "View 2". This is illustrated in the second interactive screen of FIG. 3B, in which the electronic indicator 1201 indicates that bar 1200B has been selected. A second video clip 910A' is therefore generated from the video recording associated with "View 2" on the basis of this selection in the way previously described. In particular, the second video clip 910A' comprises cut-outs of "Player 2" derived from the video recording taken with second camera view "View 2" on the basis of participant tracking data of "Player 2" in "Match 1" received at the second receiver 706. The second video clip 910A' temporally extends between the start time and end time of the event record associated with the selected timeline element 1204A. Second video clip 910A' is temporally the same as first video clip 910A, but is captured from a different field of view of the sporting event. Thus, "Player 2" 1210 can once again be seen in the second video clip 910A', but this time, "Player 2" 1210 is seen with "Player 5" 1220 and "Player 6" 1222 rather than with "Player 3" 1216 and "Player 4" 2114 because of the change in field of view (again, "Player 5" and "Player 6" happen to be featured in the virtual camera view forming the cut-out of "Player 2" in the video recording associated with "View 2" in this case). The position of "Player 2" 1210 is also indicated, on the basis of the participant tracking data of "Match 1", on the plan view image 911A of the soccer pitch 1010. The positions of "Player 5" 1220 and "Player 4" 1222 can also be seen. The position of "Player 2" is once again highlighted with a highlight graphic 1216, as previously described.

Finally, with timeline element 1204A still selected, the user may then select bar 1200C corresponding to third camera view "View 3". This is illustrated in the third interactive screen of FIG. 3C, in which the electronic indicator 1201 indicates that bar 1200C has been selected. A third video clip 910A" is therefore generated from the video recording associated with "View 3" on the basis of this selection in the way previously described. In particular, the third video clip 910A" comprises cut-outs of "Player 2" derived from the video recording taken with third camera view "View 3" on the basis of participant tracking data of "Player 2" in "Match 1" received at the second receiver 706. The third video clip 910A" temporally extends between the start time and end time of the event record associated with the selected timeline element 1204A. Third video clip 910A' is temporally the same as first video clip 910A and second video clip 910A', but is captured from yet another different field of view of the sporting event. Thus, "Player 2" 1210 can once again be seen in the second video clip 910A', but this time, "Player 2" 1210 is seen with "Player 6" 1222 and "Player 3" 1212 because of the change in field of view (again, "Player 6" and "Player 3" happen to be featured in the virtual camera view forming the cut-out of "Player 2" in the video recording associated with "View 3" in this case). The position of "Player 2" 1210 is also indicated, on the basis of the participant tracking data of "Match 1", on the plan view image 911A of the soccer pitch 1010. The positions of "Player 6" 1222 and "Player 3" 1212 can also be seen. The position of "Player 2" is once again highlighted with a highlight graphic 1216, as previously described.

In addition to being able to generate a timeline and video clips from different camera views of the same recorded sporting event, the user can also select a different recorded sporting event from which to generate a timeline and video clips from different camera views. In the embodiments of FIGS. 13A-D, each interactive screen comprises an event selection pane 1206 comprising a list of different sporting events. In this case, the list is in the form of an array of selectable elements 930A-C, each selectable element being representative of a different respective sporting event. In particular, selectable element 930A is representative of soccer match "Match 1" recorded on 2 Feb. 2015, selectable element 930B is representative of soccer match "Match 2" recorded on 9 Feb. 2015 and selectable element 930C is representative of soccer match "Match 3" recorded on 15 Feb. 2015. In this example, each selectable element 930A-C comprises a thumbnail image 932 which is, for example, a representation one frame of one of the video recordings of the sporting event associated with the selectable element, together with data 934 for helping to identify the sporting event (in this case, the data 934 including a name of the sporting event and the data on which it was recorded).

Figure 13B:
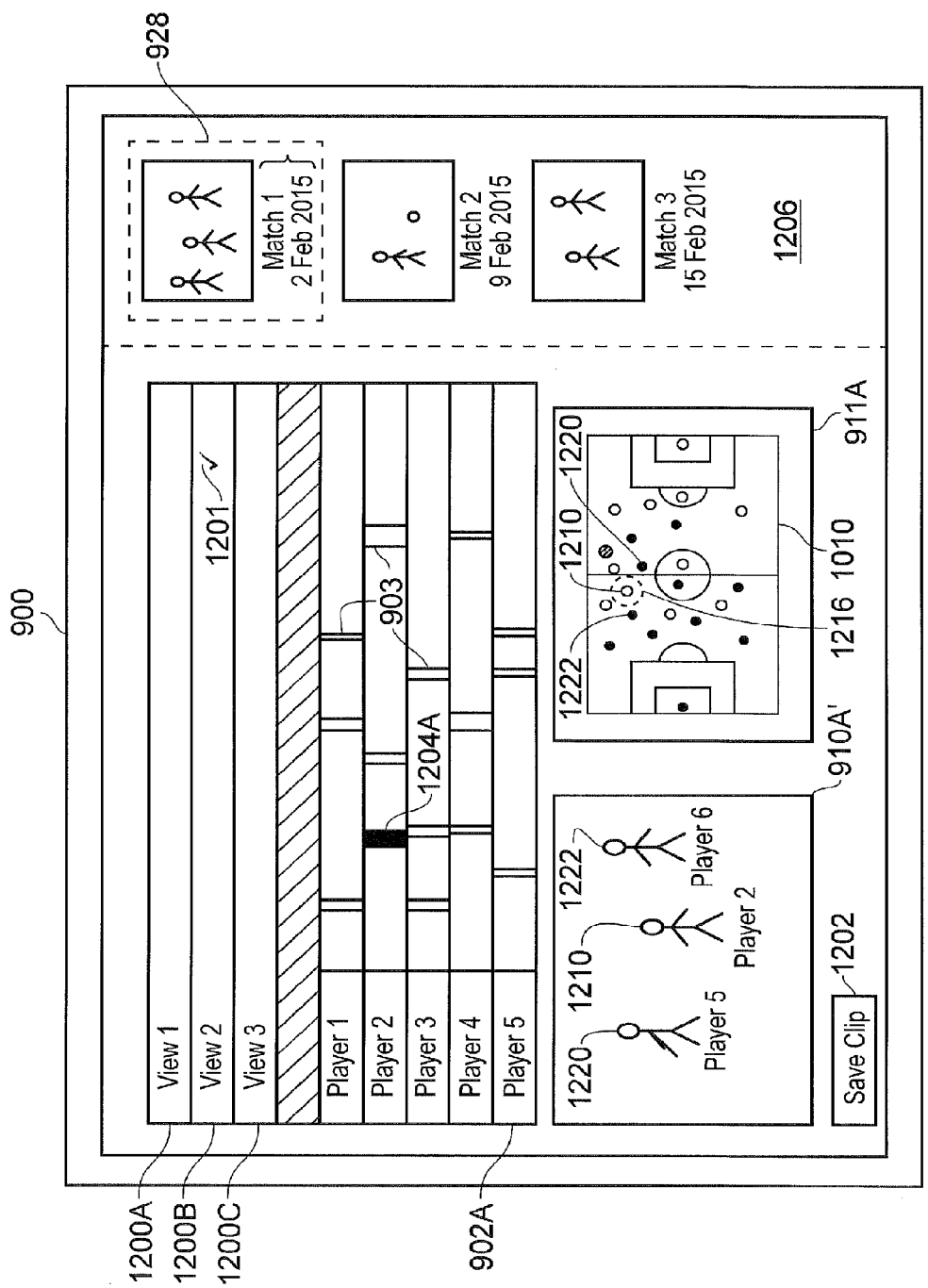
Figure 13C:
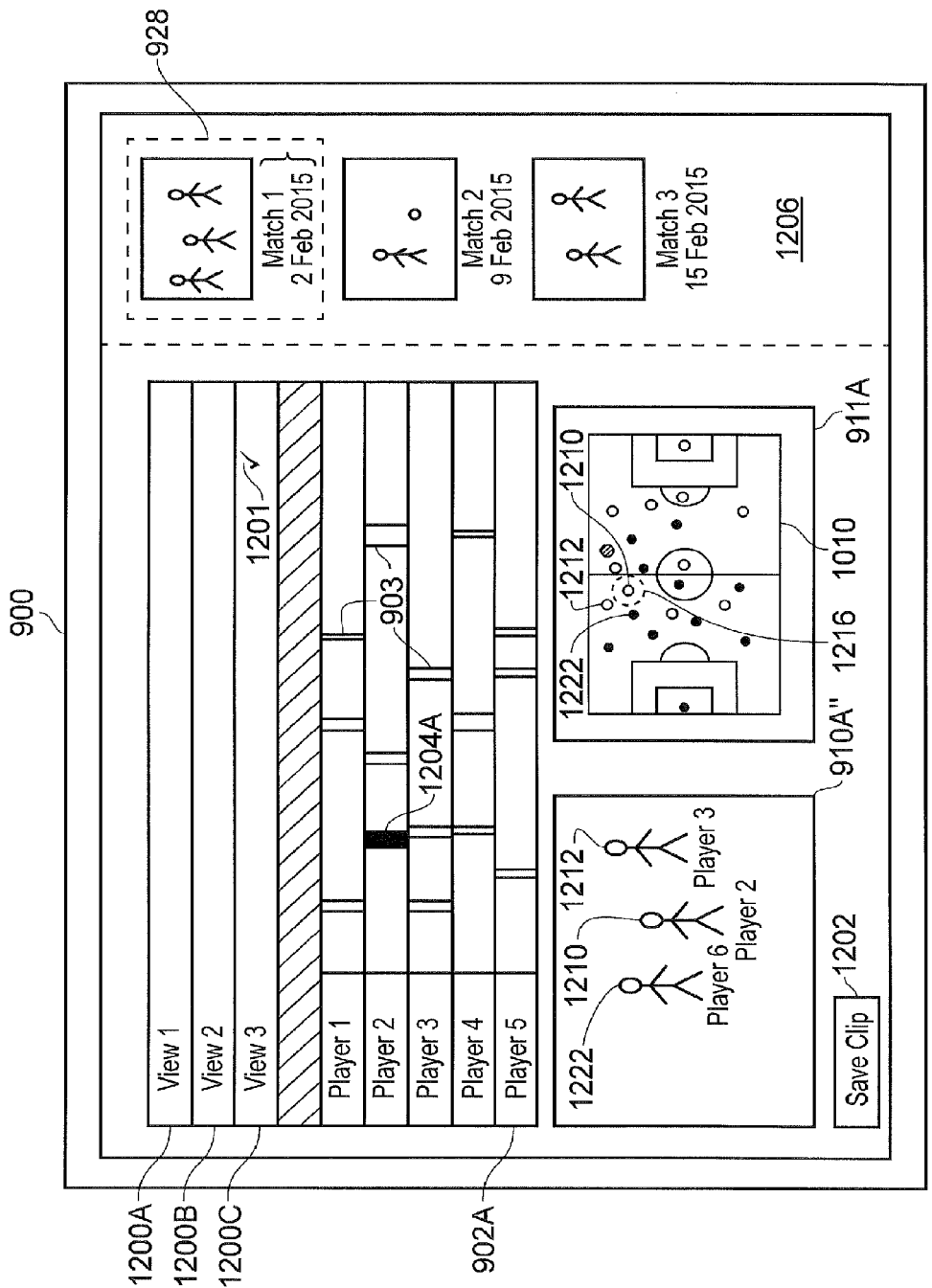

FIGS. 13A-C all relate to the sporting event "Match 1", which has been selected via its associated selection element 930A as indicated by electronic selection identifier 928. As shown in the fourth interactive screen of FIG. 3D, however, the user may then go onto select "Match 2" from the event selection pane 1206, as indicated by the electronic selection identifier 928 in FIG. 3D.

Figure 13D:
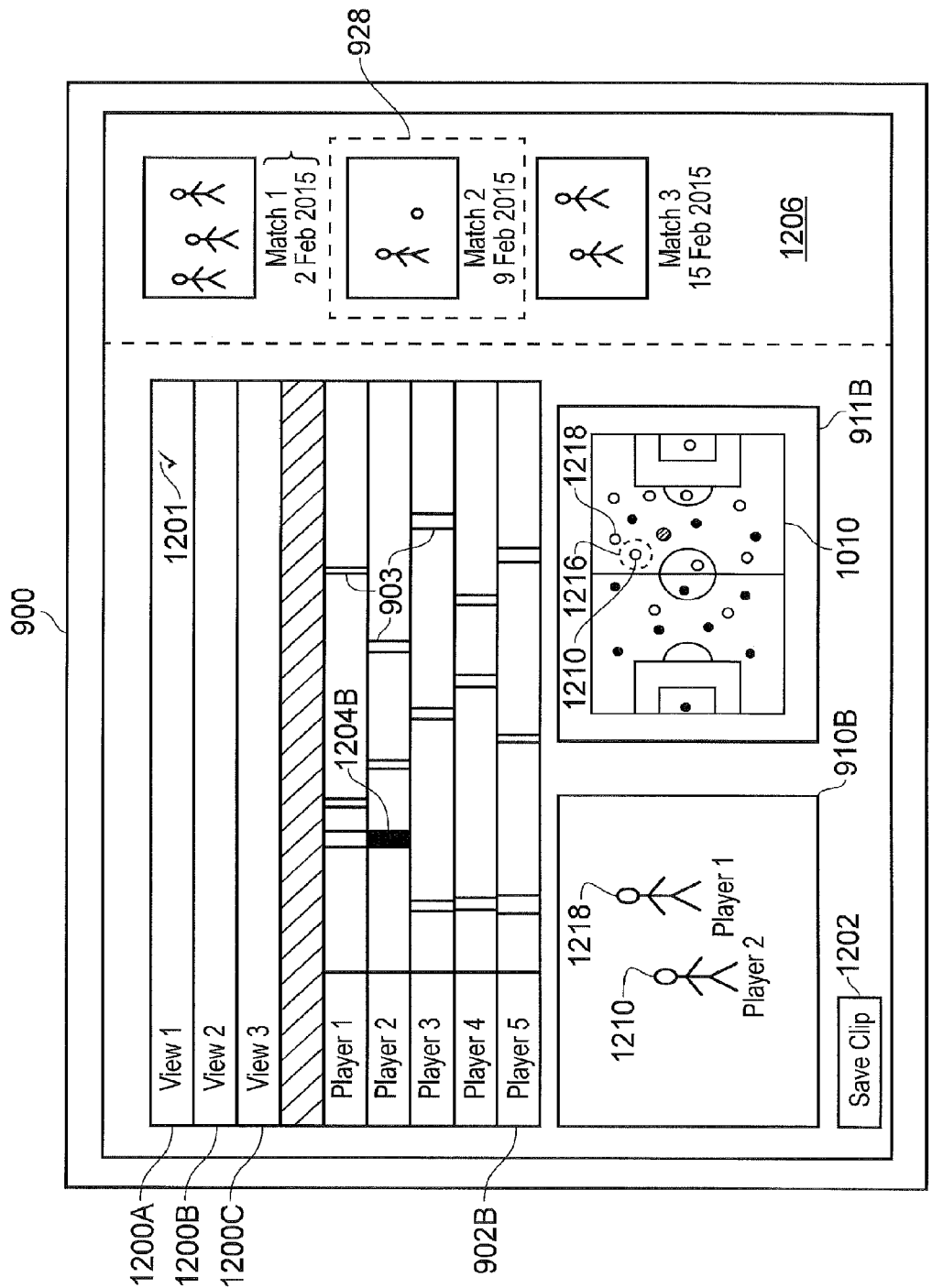

In response to the selection of "Match 2", a timeline 902B for event "Match 2" is generated and displayed. The timeline 902B is generated based on event records for "Match 2" received at the first receiver 704 in the way previously described. It will be appreciated that the timeline 902B will be different to the timeline 902A because it relates to a different sporting event ("Match 2" instead of "Match 1"). The timeline 902B includes timeline elements 903 as previously described. Each of the camera views are also once again available for selection via selection bars 1200A, 1200B and 1200C. In the example of FIG. 13D, the user has selected bar 1200A (corresponding to first camera view "View 1") and has selected timeline element 1204B, which corresponds to an event record which again identifies participant "Player 2". Note that this is the same participant "Player 2" as identified by the event record corresponding to the selected timeline element 1204A for "Match 1" in FIGS. 13A-C. The only difference is that "Player 2" is participating in "Match 2" instead of "Match 1" in this case. A fourth video clip 910B is therefore generated on the basis of the selection of timeline element 1204B in the way previously described. In particular, the video clip 910B comprises cut-outs of "Player 2" derived from the video recording of "Match 2" at first camera view ("View 1") on the basis of participant tracking data of "Player 2" in "Match 2" received at the second receiver 706. The fourth video clip 910B temporally extends between the start time and end time of the event record associated with the selected timeline element 1204B. "Player 2" 1210 can be seen in the fourth video clip 910B of FIG. 13D, together with "Player 1" 1218 ("Player 1" again happens to be featured in the virtual camera view forming the cut-out of "Player 2" in this case). The position of "Player 2" 1210 is also indicated, on the basis of the participant tracking data of "Match 2", on the plan view image 911B of the soccer pitch 1010. The position of "Player 1" 1218 can also be seen. The position of "Player 2" is again highlighted with a highlight graphic 1216, as previously described.

It will be appreciated that video clips generated on the basis of the selection of timeline element 1204B may be generated from the different video recordings of "Match 2" associated with the different camera views "View 1", "View 2" and "View 3" in response to user selection of the bars 1200A, 1200B and 1200C in the same way as described with respect to FIGS. 13A-C for "Match 1" will also be appreciated that the camera views "View 1", "View 2" and "View 3" of each video recording of "Match 2" may be the same or may be different to the camera views "View 1", "View 2" and "View 3" in "Mach 1". This depends on the physical positioning and settings (for example, the pan, tilt and zoom) of each of the cameras used to captured a video recording of "Match 1" and "Match 2". The video recordings associated with each sporting event listed in the event selection pane 1206 are stored in the storage unit 712.

It will thus be appreciated that video clips may be generated on the basis of video recordings captured from different camera views of the same sporting event and/or on the basis of video recordings of different sporting events in an easy and intuitive manner using embodiments of the present disclosure.

In an embodiment of the present disclosure, there is a presentation mode in which one or more generated video clips can be saved as part of a presentation by a user selecting the "Save Clip" virtual button 1202 illustrated in FIGS. 13A-D (for example, the user may touch or click on the virtual button 1202). For example, if the user wishes to save the first video clip 910A shown in FIG. 13A as part of a presentation, then following the selection of timeline element 1204A, which causes the display of first video clip 910A, the user selects virtual button 1202 and the first video 910A clip is saved to the storage device 712 as part of the presentation. Similarly, if the user then wishes to save the fourth video clip 910B shown in FIG. 13D as part of the presentation, then following the selection of timeline element 1204B, which causes the display of fourth video clip 910B, the user again selects virtual button 1202 and the fourth video clip 910B is saved to the storage device 712 as part of the presentation.

Thus, in the above-described manner, a user is able to select and save video clips from each of the recorded sporting events by selecting the selection element 930A, 930B or 930C corresponding to the desired sporting event, selecting a timeline element of the timeline generated for that recorded sporting event, selecting the bar 1200A, 1200B or 1200C corresponding to the desired camera view, and saving the video clip generated by selecting the virtual button 1202. Once the user is happy with the video clips saved for the presentation, the user may then save the presentation using, for example, a virtual button or the like (not shown).

For each video clip saved as part of the presentation, the original video recording of the sporting event from which the video clip is generated is saved in the storage unit 712 as a new electronic video file which temporally extends between the start time and the end time of the event record associated with the video clip. Information for identifying the one or more cut-outs from which the video clip is formed (for example, parameters indicating the yaw, pitch and zoom of the virtual camera for each cut-out, or even the participant position from which the yaw, pitch and zoom of the virtual camera for each cut-out is generated) is also saved in the storage unit 712 and is associated with or saved as part of the new electronic video file. Each new electronic video file of the presentation is furthermore associated with a presentation identifier for identifying the presentation saved in the storage unit 712. The presentation identifier may be determined by the user (for example, the user may be given the opportunity to enter a chosen name of the presentation using a keyboard or the like when the presentation is initially saved) or may be determined automatically.

Figure 14:
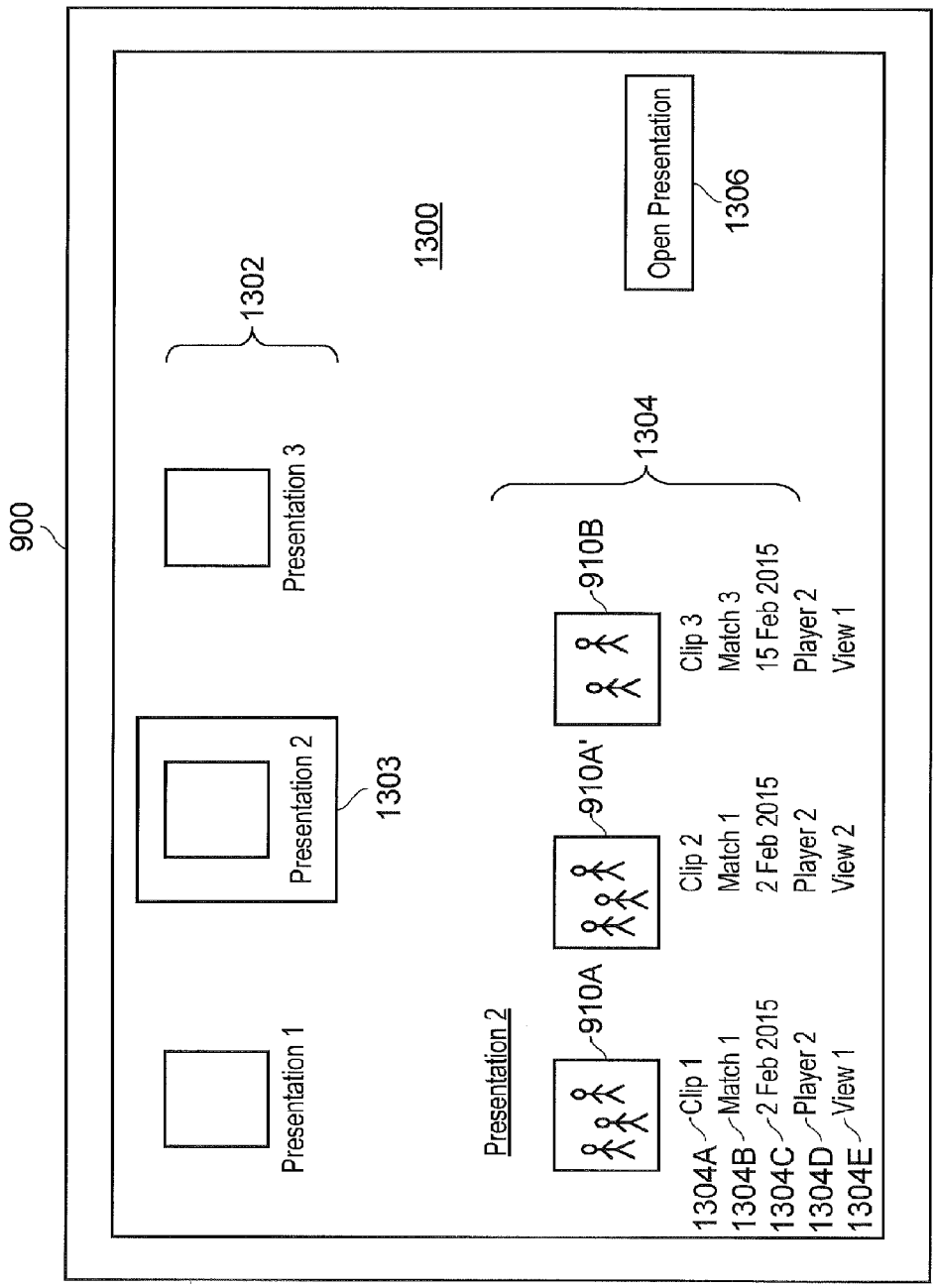
FIG. 14 shows a presentation selection screen according to an embodiment of the present disclosure.

When a presentation has been saved, it may be retrieved from the storage unit 712 via an interactive presentation selection screen generated by the controller 702 and output by the display output element 714 for display on the display device 900. An example of a presentation selection screen 1300, according to an embodiment, is illustrated in FIG. 14.

The presentation screen 1300 displays each of the saved presentations 1302. Each saved presentation may be selected by a user (for example, the user may touch or click on the presentation they wish to select). In the example of FIG. 14, the presentation named "Presentation 2" has been selected by the user. The selection is indicated by highlight graphic 1303. In this example, "Presentation 2" includes first video clip 910A of FIG. 13A, second video clip 910A' of FIG. 13B and fourth video clip 910B of FIG. 13D. In response to the selection of "Presentation 2", a preview 1304 of "Presentation 2" is shown. The preview shows each of the video clips from which "Presentation 2" is formed. It can be seen that "Presentation 2" includes video clips 910A, 910A' and 910B. Advantageously, the preview 1304 of "Presentation 2" allows the user to quickly review which video clips are included in the presentation and to therefore easily and accurately choose the correct presentation. As well as a thumbnail image of each of the video clips 910A, 910A' and 910B, further information about each video clip is also provided as part of the preview 1304. In this example, each video clip in the preview 1304 is displayed with information including the name of the video clip 1304A, the sporting event to which the video clip relates 1304B, the date of the sporting event 1304C, the identifier of the participant featured in the video clip 1304D and the camera view 1304E of the video clip.

In the case of "Presentation 2", the participant of each video clip is the same participant ("Player 2"), thus advantageously allowing the performance of this participant to be reviewed during recorded events over a plurality of different sporting events. In this case, "Player 2" is a soccer player, and therefore the performance of "Player 2" during a first event relating to video clips 910A and 910A' in "Match 1" and a second event relating to video clip 910B in "Match 2" may be reviewed using "Presentation 2".

Figure 15:
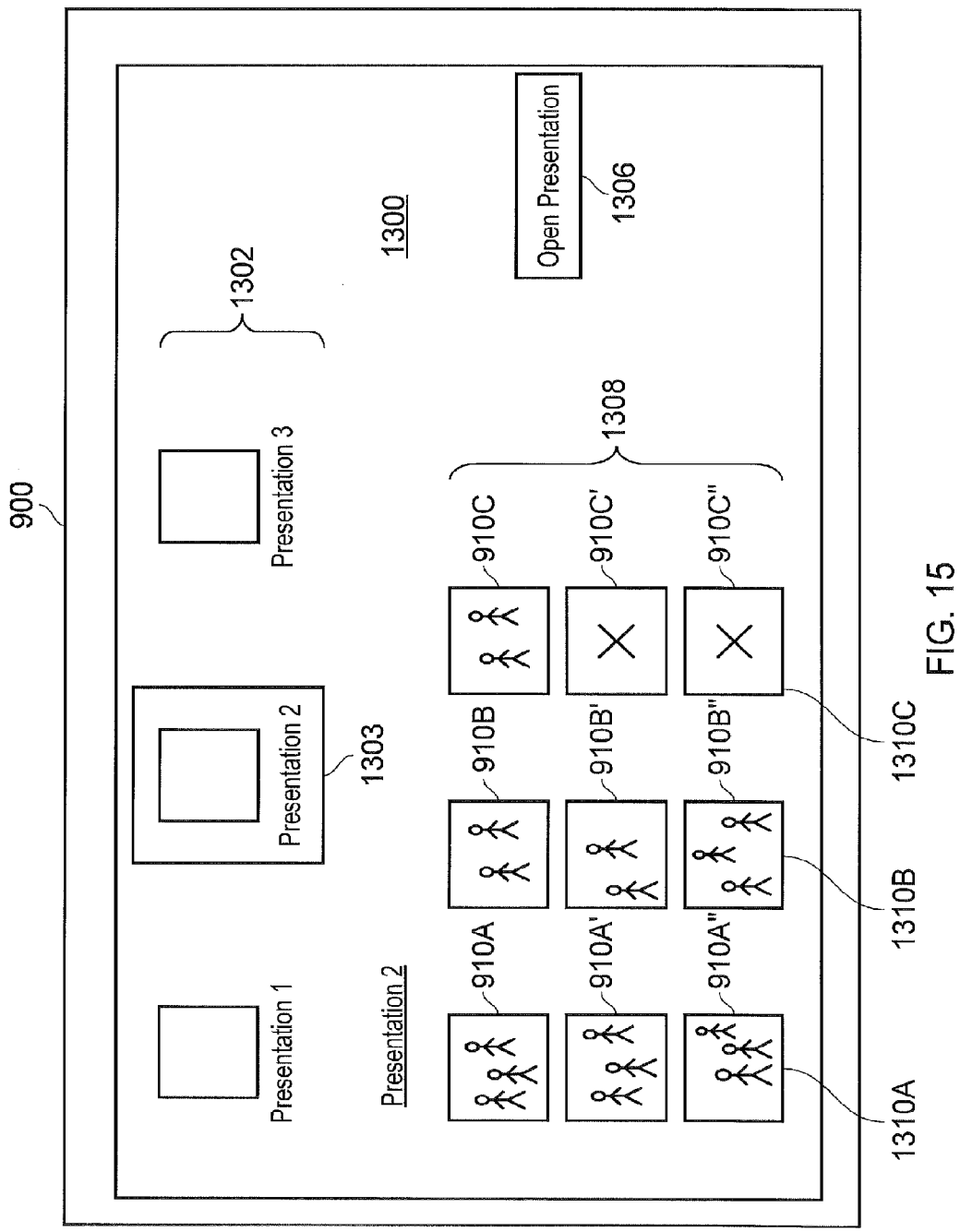
FIG. 15 shows a second presentation selection screen according to an embodiment of the present disclosure.

FIG. 15 shows the presentation screen of an alternative embodiment of the presentation mode. In this alternative embodiment, when a user selects to save a video clip generated on the basis of a particular selected timeline element (as described with reference to FIGS. 13A-D), a video clip generated from the video recording of each of the camera views is saved in the storage unit 712 as part of the presentation. Thus, for example, if the user were to select to save first video clip 910A generated from timeline element 1204, then second video clip 910A' and third video clip 910A" will also be saved. Advantageously, this allows a user to save all video clips associated with the same temporal event using a single operation. A saved presentation may then be presented as shown in FIG. 15.

The presentation screen of FIG. 15 is different to the presentation screen of FIG. 14 in that it comprises preview grid 1308 instead of linear preview 1304. Each column of the preview grid 1308 displays thumbnail images representing video clips corresponding to the same timeline element but captured from different camera views. The thumbnail images may be video or still images. In this example, column 1310A contains video clips 910A, 910A' and 910A" corresponding to timeline element 1204A (see FIGS. 13A-C) and column 1310B contains video clips 910B, 910B' and 910B" corresponding to timeline element 1204B. Unlike video clip 910B, video clips 910B' and 910B" are not shown in FIG. 13D. However, it will be appreciated that video clips 910B' and 910B" are video clips of the same temporal portion of recorded sporting event "Match 2" as that of video clip 910B but which have been captured from different respective camera views to that of video clip 910B, as has been explained. Column 1310C contains a single video clip 910C. In this case, however, video clip 910C has been generated from a further recorded sporting event (not shown in the Figures) for which only one video recording (from a single camera view) has been stored in the storage unit 712. Thus, the remaining portions 910C' and 910C" of column 1310C are shown to be blank in this case.

Advantageously, by saving every video clip associated with a selected timeline element and by presenting the saved video clips using the preview grid 1308 of FIG. 15, a user is able to quickly and conveniently see all the video clips captured with different camera views for a particular event in the presentation. Furthermore, a user may cause a desired video clip to be played back by selecting the relevant thumbnail of interest. For example, if the user wishes for video clip 910A to be played back, then they may select the thumbnail representing video clip 910A in the preview grid 1308 (using a touch or click operation via user interface element 716, for example) so as to initiate playback. Improved event analysis capability is thus provided to the user. It will be appreciated that, in another embodiment, each row (rather than each column) of the preview grid 1308 may display thumbnail images representing video clips corresponding to the same timeline element but captured from different camera views.

Once a presentation has been selected ("Presentation 2" in the case of FIGS. 14 and 15), the presentation may be opened by the user selecting the "Open Presentation" virtual button 1306. In response to this, the controller 702 causes each of the video clips in the presentation to be sequentially played back and output for display via the display output element 714. In the case of the embodiment of FIG. 15, each video clip representing the same event (for example, video clips 910A, 910K and 910K') may be, for example, played back sequentially or, alternatively, played back simultaneously in different windows on the interactive screen. During the sequential playback of the video clips of the opened presentation, the presentation remains interactive. For example, the sequential playback of the video clips may be paused, rewound, fast forwarded, etc., graphics may be added to the video clips and the yaw, pitch and zoom of the virtual camera may be adjusted so as to change the cut-out (and therefore the perceived field of view) of each video clip as it is being played (each of these examples may be implemented with on screen controls or the like (not shown) which are selectable and controllable by the user).

Note that the latter example (adjustment of the yaw, pitch and zoom of the virtual camera during playback of each video clip) is possible because, for each video clip, it is a temporal portion of the original video recording of the sporting event from which that video clip is generated which is saved in the storage unit for the presentation (as mentioned above). The yaw, pitch and zoom of the virtual camera (which defines each cut-out of a video clip) may therefore be adjusted away from the yaw, pitch and zoom determined by the participant position, thus allowing to the user move the virtual camera around the recorded scene of the sporting event over the duration of each video clip. This provides enhanced interactive review and analysis capability of the video clips in the presentation. At the same time, because only a temporal portion of the full view original video recording is saved for each video clip in the presentation (rather than the entire length original video recording), storage space in the storage unit 712 is saved.

It is noted that a presentation of video clips in the way described above may be produced even when the video clips are generated using a method other than that which utilises the timeline. That is, a video clip of the full view video recording of a sporting event may be generated in any way which establishes a start time, an end time and a participant of the sporting event for which there is tracking data. The video clip may then be added to a presentation in the way described. In this case, the timeline generator 708 is not necessarily required, and instead, the user selects each of the start time, end time and participant of the sporting event (each participant still being identified with an identifier) either manually (using an appropriate user interface—not shown) or by selecting an event record from the raw data shown in FIG. 8, for example. The user selection in this case will occur via user input 716.

In embodiments, each video clip saved as part of a presentation is saved in the storage unit 712 as a new electronic video file which temporally extends between the start time and the end time of the event record associated with the video clip. However, in an alternative embodiment, the new electronic video file temporally extends from a first time which may precede the start time of the associated event record (for example, by a time corresponding to a predetermined number of frames of the relevant video recording) to a second time which may be subsequent to the end time of the associated event record (again, for example, by a time corresponding to a predetermined number of frames of the relevant video recording). Thus, in other words, the new electronic video file extends from a first time to a second time, and each of the start time and the end time of the associated event record are within the period defined between the first time and the second time. In addition, participant position data and/or virtual camera yaw, pitch and zoom data is saved for the time period between the first and second time so as to allow cut-out generation between the first and second time. In some embodiments, the same is true for the generation of a video clip following the selection of a timeline element 903. That is, the video clip is generated between a first time and a second time, and each of the start time and the end time of the event record associated with the video clip are within the period defined between the first time and the second time. The video clip generation includes cut-out generation based on participant position data and/or virtual camera yaw, pitch and zoom data for the time period between the first and second time. Advantageously, this provides greater flexibility to the user when generating video clips from the timeline and when reviewing saved video clips, allowing the user to review occurrences during the recorded sporting event which occurred before the start time of the relevant event record and after the end time of the relevant event record. It will be appreciated that, in some embodiments (including the embodiments described with reference to the Figures), the first time is equal to the start time of the relevant event record and the second time is equal to the end time of the relevant event record.

Figure 16:
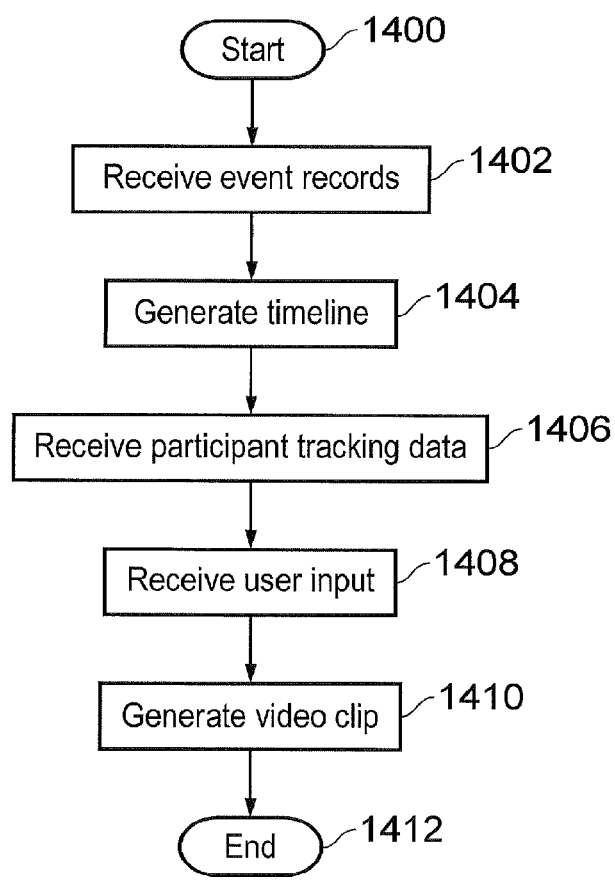
FIG. 16 shows a flowchart indicating a process of video clip generation according to an embodiment of the present disclosure.

A flowchart indicating a process of video clip generation according to an embodiment of the present disclosure is illustrated in FIG. 16.

The process starts at step 1400. At step 1402, receiver 704 receives a plurality of event records, each event record indicating a start time, an end time and an identifier of a participant of the sporting event. At step 1404, timeline generator 708 generates a timeline of the sporting event and outputs the timeline for display. The timeline indicates an elapsed time of the video recording of the sporting event along a first axis, the timeline indicates the identifier of the participant of the sporting event of each event record along a second axis, and the timeline comprises a plurality of timeline elements each corresponding to a respective event record, each timeline element extending along a portion of the first axis defined between the start time and the end time of its corresponding event record and each timeline element extending along a portion of the second axis associated with the identifier of the participant of the sporting event of its corresponding event record. At step 1406, receiver 706 receives participant tracking data indicative of a position of each participant of the sporting event identified by the identifier of one of the event records at each of a plurality of times during the elapsed time of the video recording of the sporting event. At step 1408, user input element 716 receives an input from a user to select one of the timeline elements when the timeline is displayed. At step 1410, video clip generator 710, in response to the user selection of one of the first timeline elements, generates a video clip from the video recording of the sporting event and outputs the video clip for display. The video clip is a portion of the video recording of the sporting event temporally extending between a first time and a second time, each of the start time and the end time of the first event record corresponding to the selected timeline element being within the period defined between the first time and the second time, and the video clip comprises one or more cut out portions of the video recording of the sporting event, each cut-out portion being generated on the basis of the participant tracking data of the participant of the sporting event identified by the identifier of the event record corresponding to the selected timeline element. The process then ends at step 1412.

Figure 17:
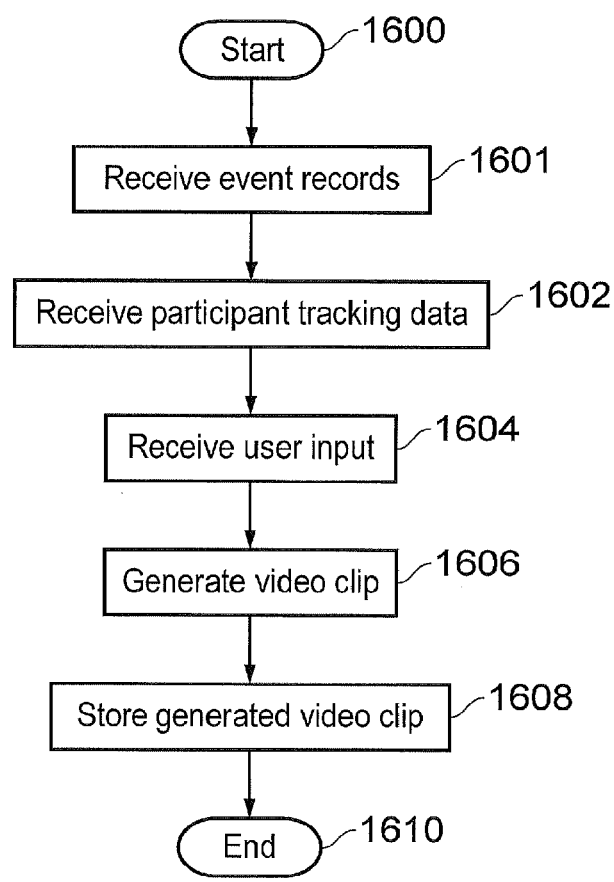
FIG. 17 shows a flowchart indicating a process of video clip presentation generation according to an embodiment of the present disclosure.

A flowchart indicating a process of video clip presentation generation according to an embodiment of the present disclosure is illustrated in FIG. 17.

The process starts at step 1600. At step 1601, receiver 704 receives a plurality of event records, each event record indicating a start time, an end time and an identifier of a participant of the sporting event. At step 1602, receiver 706 receives participant tracking data indicative of a position of each participant of the sporting event identified by the identifier of one of the event records at each of a plurality of times during an elapsed time of the video recording of the sporting event. At step 1604, user input element 716 receives an input from a user to select one of the event records. At step 1606, video clip generator 710, in response to the user selection of one of the event records, generates a video clip from the video recording of the sporting event. The video clip is a portion of the video recording of the sporting event temporally extending between a first time and a second time, each of the start time and the end time of the selected event record being within the period defined between the first time and the second time, and the video clip comprises one or more cut out portions of the video recording of the sporting event, each cut-out portion being generated on the basis of the participant tracking data of the participant of the sporting event identified by the identifier of the selected event record. At step 1608, the controller 702 stores the generated video clip as an electronic video file in the storage unit, the electronic video file comprising a portion of the video recording of the sporting event temporally extending between the first time and the second time, and the electronic video file being associated with the participant tracking data of the participant of the sporting event identified by the identifier of the selected event record and on which the generation of the one or more cut out portions of the video recording of the sporting event comprised within the video clip is based. The process then ends at step 1610.

Respective features of embodiments of the present disclosure are defined by the following numbered clauses:

Clause 1. An apparatus for analysing a video recording of a sporting event, comprising:
first receiver circuitry operable to receive a plurality of first event records, each first event record indicating a start time, an end time and an identifier of a participant of the sporting event;
timeline generator circuitry operable to generate a timeline of the sporting event and to output the timeline for display, wherein the timeline indicates an elapsed time of the video recording of the sporting event along a first axis, the timeline indicates the identifier of the participant of the sporting event of each first event record along a second axis, and the timeline comprises a plurality of first timeline elements each corresponding to a respective first event record, each first timeline element extending along a portion of the first axis defined between the start time and the end time of its corresponding first event record and each first timeline element extending along a portion of the second axis associated with the identifier of the participant of the sporting event of its corresponding first event record;
second receiver circuitry operable to receive participant tracking data indicative of a position of each participant of the sporting event identified by the identifier of one of the first event records at each of a plurality of times during the elapsed time of the video recording of the sporting event; input circuitry operable to receive an input to select one of the first timeline elements when the timeline is displayed; and
video clip generating circuitry operable to, in response to the selection of one of the first timeline elements, generate a video clip from the video recording of the sporting event and to output the video clip for display, the video clip being a portion of the video recording of the sporting event temporally extending between a first time and a second time, each of the start time and the end time of the first event record corresponding to the selected first timeline element being within the period defined between the first time and the second time, and the video clip comprising one or more cut out portions of the video recording of the sporting event, each cut-out portion being generated on the basis of the participant tracking data of the participant of the sporting event identified by the identifier of the first event record corresponding to the selected first timeline element.

Clause 2. An apparatus according to clause 1, wherein the video clip comprises a cut-out portion generated on the basis of each position of the participant of the sporting event identified by the identifier of the first event record corresponding to the selected first timeline element recorded at a time between the first time and the second time.

Clause 3. An apparatus according to any preceding clause, wherein:
the input circuitry is operable to receive an input to select a plurality of the first timeline elements when the timeline is displayed; and
the video clip generating circuitry is operable to, in response to the user selection of the plurality of first timeline elements, generate a video clip from the video recording of the sporting event and to output the video clip for display, the video clip being a portion of the video recording of the sporting event temporally extending between a first time and a second time, each of the earliest start time of the start times of the first event records corresponding to the selected first timeline elements and the latest end time of the end times of the first event records corresponding to the selected first timeline elements being within the period defined between the first time and the second time, and the video clip comprising one or more cut out portions of the video recording of the sporting event, each cut-out portion being generated on the basis of the participant tracking data of the participant of the sporting event identified by the identifier of each of the first event records corresponding to the selected first timeline elements.

Clause 4. An apparatus according to any preceding clause, wherein:
the first receiver circuitry is operable to receive one or more second event records, each second event record indicating a start time, an end time and an identifier of an event during the sporting event; and
the timeline generated and output for display by the timeline generating circuitry indicates the identifier of the event during the sporting event of each second event record along the second axis, and the timeline comprises one or more second timeline elements each corresponding to a respective second event record, each second timeline element extending along a portion of the first axis defined between the start time and the end time of its corresponding second event record and each second timeline element extending along a portion of the second axis associated with the identifier of the event during the sporting event of its corresponding second event record.

Clause 5. An apparatus according to clause 6, wherein:
the input circuitry is operable to receive an input to select one of the second timeline elements when the timeline is displayed; and
the video clip generating circuitry is operable to, in response to the user selection of one of the second timeline elements, generate the video clip from the video recording of the sporting event and to output the video clip for display, the video clip being a portion of the video recording of the sporting event temporally extending between a first time and a second time, each of the start time and the end time of the second event record corresponding to the selected second timeline element being within the period defined between the first time and the second time.

Clause 6. An apparatus according to any preceding clause, wherein the position of each participant of the sporting event identified by the identifier of one of the first event records at each of a plurality of times during the elapsed time of the video recording of the sporting event is a two dimensional position defined within a two dimensional coordinate system defined relative to a surface on which the sporting event is carried out.

Clause 7. An apparatus according to clause 6, wherein:
the video clip generating circuitry is operable to, in response to the selection of one of the first timeline elements, generate a plan view image of the surface on which the sporting event is carried out and to output the plan view image for display, the plan view image being a video image temporally extending between the first time and the second time, and the plan view image indicating the position of each participant of the sporting event identified by the identifier of one of the first event records recorded at a time between the first time and the second time.

Clause 8. An apparatus according to any preceding clause, wherein the sporting event is a soccer match.

Clause 9. An apparatus according to any preceding clause, comprising:
controller circuitry; and
a storage unit; wherein
the controller circuitry is operable to store the generated video clip as an electronic video file in the storage unit, the electronic video file comprising a portion of the video recording of the sporting event temporally extending between the between the first time and the second time, and the electronic video file being associated with the participant tracking data of the participant of the sporting event identified by the identifier of the first event record corresponding to the selected first timeline element on which the generation of the one or more cut out portions of the video recording of the sporting event comprised within the video clip is based.

Clause 10. An apparatus according to any preceding clause, comprising:
controller circuitry; and
a storage unit; wherein
the controller circuitry is operable to generate and output for display a list comprising a plurality of video recordings stored in the storage unit, each video recording being a selectable video recording of a different respective sporting event;
the user input circuitry is operable to receive an input from the user to select one of the listed video recordings when the list is displayed; and
the controller circuitry is operable to determine the selected one of the selectable video recordings to be the video recording to be analysed; wherein:
the list comprising the plurality of video recordings is output for simultaneous display with the timeline generated by the timeline generating circuitry.

Clause 11. An apparatus according to clause 1, wherein the first time is equal to the start time of the first event record corresponding to the selected first timeline element and the second time is equal to the end time of the first event record corresponding to the selected first timeline element.

Clause 12. A method of analysing a video recording of a sporting event, comprising:

receiving a plurality of first event records, each first event record indicating a start time, an end time and an identifier of a participant of the sporting event;

generating a timeline of the sporting event and outputting the timeline for display, wherein the timeline indicates an elapsed time of the video recording of the sporting event along a first axis, the timeline indicates the identifier of the participant of the sporting event of each first event record along a second axis, and the timeline comprises a plurality of first timeline elements each corresponding to a respective first event record, each first timeline element extending along a portion of the first axis defined between the start time and the end time of its corresponding first event record and each first timeline element extending along a portion of the second axis associated with the identifier of the participant of the sporting event of its corresponding first event record;

receiving participant tracking data indicative of a position of each participant of the sporting event identified by the identifier of one of the first event records at each of a plurality of times during the elapsed time of the video recording of the sporting event;

receiving an input to select one of the first timeline elements when the timeline is displayed; and generating, in response to the selection of one of the first timeline elements, a video clip from the video recording of the sporting event and outputting the video clip for display, the video clip being a portion of the video recording of the sporting event temporally extending between a first time and a second time, each of the start time and the end time of the first event record corresponding to the selected first timeline element being within the period defined between the first time and the second time, and the video clip comprising one or more cut out portions of the video recording of the sporting event, each cut-out portion being generated on the basis of the participant tracking data of the participant of the sporting event identified by the identifier of the first event record corresponding to the selected first timeline element.

Clause 13. A program for controlling a computer to perform a method according to clause 12.

Clause 14. A storage medium storing a computer program according to clause 13.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. An apparatus for analysing a video recording of a sporting event, comprising:

first receiver circuitry operable to receive a plurality of first event records, each first event record indicating a start time, an end time and an identifier of a participant of the sporting event;

timeline generator circuitry operable to generate a timeline of the sporting event and to output the timeline for display, wherein the timeline indicates an elapsed time of the video recording of the sporting event along a first axis, the timeline indicates the identifier of the participant of the sporting event of each first event record along a second axis, and the timeline comprises a plurality of first timeline elements each corresponding to a respective first event record, each first timeline element extending along a portion of the first axis defined between the start time and the end time of its corresponding first event record and each first timeline element extending along a portion of the second axis associated with the identifier of the participant of the sporting event of its corresponding first event record;

second receiver circuitry operable to receive participant tracking data indicative of a position of each participant of the sporting event identified by the identifier of one of the first event records at each of a plurality of times during the elapsed time of the video recording of the sporting event;

input circuitry operable to receive an input to select one of the first timeline elements when the timeline is displayed; and video clip generating circuitry operable to, in response to the selection of one of the first timeline elements, generate a video clip from the video recording of the sporting event and to output the video clip for display, the video clip being a portion of the video recording of the sporting event temporally extending between a first time and a second time, each of the start time and the end time of the first event record corresponding to the selected first timeline element being within the period defined between the first time and the second time, and the video clip comprising one or more cut out portions of the video recording of the sporting event, each cut-out portion being generated on the basis of the participant tracking data of the participant of the sporting event identified by the identifier of the first event record corresponding to the selected first timeline element.

2. An apparatus according to claim 1, wherein the video clip comprises a cut-out portion generated on the basis of each position of the participant of the sporting event identified by the identifier of the first event record corresponding to the selected first timeline element recorded at a time between the first time and the second time.

3. An apparatus according to claim 1, wherein:
the input circuitry is operable to receive an input to select a plurality of the first timeline elements when the timeline is displayed; and
the video clip generating circuitry is operable to, in response to the user selection of the plurality of first timeline elements, generate a video clip from the video recording of the sporting event and to output the video clip for display, the video clip being a portion of the video recording of the sporting event temporally extending between a first time and a second time, each of the earliest start time of the start times of the first event records corresponding to the selected first timeline elements and the latest end time of the end times of the first event records corresponding to the selected first timeline elements being within the period defined between the first time and the second time, and the video clip comprising one or more cut out portions of the video recording of the sporting event, each cut-out portion being generated on the basis of the participant tracking data of the participant of the sporting event identified by the identifier of each of the first event records corresponding to the selected first timeline elements.

4. An apparatus according to claim 1, wherein:
the first receiver circuitry is operable to receive one or more second event records, each second event record indicating a start time, an end time and an identifier of an event during the sporting event; and
the timeline generated and output for display by the timeline generating circuitry indicates the identifier of the event during the sporting event of each second event record along the second axis, and the timeline comprises one or more second timeline elements each corresponding to a respective second event record, each second timeline element extending along a portion of the first axis defined between the start time and the end time of its corresponding second event record and each second timeline element extending along a portion of the second axis associated with the identifier of the event during the sporting event of its corresponding second event record.

5. An apparatus according to claim 4, wherein:
the input circuitry is operable to receive an input to select one of the second timeline elements when the timeline is displayed; and
the video clip generating circuitry is operable to, in response to the user selection of one of the second timeline elements, generate the video clip from the video recording of the sporting event and to output the video clip for display, the video clip being a portion of the video recording of the sporting event temporally extending between a first time and a second time, each of the start time and the end time of the second event record corresponding to the selected second timeline element being within the period defined between the first time and the second time.

6. An apparatus according to claim 1, wherein the position of each participant of the sporting event identified by the identifier of one of the first event records at each of a plurality of times during the elapsed time of the video recording of the sporting event is a two dimensional position defined within a two dimensional coordinate system defined relative to a surface on which the sporting event is carried out.

7. An apparatus according to claim 6, wherein:
the video clip generating circuitry is operable to, in response to the selection of one of the first timeline elements, generate a plan view image of the surface on which the sporting event is carried out and to output the plan view image for display, the plan view image being a video image temporally extending between the first time and the second time, and the plan view image indicating the position of each participant of the sporting event identified by the identifier of one of the first event records recorded at a time between the first time and the second time.

8. An apparatus according to claim 1, wherein the sporting event is a soccer match.

9. An apparatus according to claim 1, comprising:
controller circuitry; and
a storage unit; wherein
the controller circuitry is operable to store the generated video clip as an electronic video file in the storage unit, the electronic video file comprising a portion of the video recording of the sporting event temporally extending between the between the first time and the second time, and the electronic video file being associated with the participant tracking data of the participant of the sporting event identified by the identifier of the first event record corresponding to the selected first timeline element on which the generation of the one or more cut out portions of the video recording of the sporting event comprised within the video clip is based.

10. An apparatus according to claim 1, comprising:
controller circuitry; and
a storage unit; wherein
the controller circuitry is operable to generate and output for display a list comprising a plurality of video recordings stored in the storage unit, each video recording being a selectable video recording of a different respective sporting event;
the user input circuitry is operable to receive an input from the user to select one of the listed video recordings when the list is displayed; and
the controller circuitry is operable to determine the selected one of the selectable video recordings to be the video recording to be analysed; wherein:
the list comprising the plurality of video recordings is output for simultaneous display with the timeline generated by the timeline generating circuitry.

11. An apparatus according to claim 1, wherein the first time is equal to the start time of the first event record corresponding to the selected first timeline element and the second time is equal to the end time of the first event record corresponding to the selected first timeline element.

12. A method of analysing a video recording of a sporting event, comprising:
receiving a plurality of first event records, each first event record indicating a start time, an end time and an identifier of a participant of the sporting event;
generating a timeline of the sporting event and outputting the timeline for display, wherein the timeline indicates an elapsed time of the video recording of the sporting event along a first axis, the timeline indicates the identifier of the participant of the sporting event of each first event record along a second axis, and the timeline comprises a plurality of first timeline elements each corresponding to a respective first event record, each first timeline element extending along a portion of the first axis defined between the start time and the end time of its corresponding first event record and each first timeline element extending along a portion of the second axis associated with the identifier of the participant of the sporting event of its corresponding first event record;

receiving participant tracking data indicative of a position of each participant of the sporting event identified by the identifier of one of the first event records at each of a plurality of times during the elapsed time of the video recording of the sporting event;

receiving an input to select one of the first timeline elements when the timeline is displayed; and generating, in response to the selection of one of the first timeline elements, a video clip from the video recording of the sporting event and outputting the video clip for display, the video clip being a portion of the video recording of the sporting event temporally extending between a first time and a second time, each of the start time and the end time of the first event record corresponding to the selected first timeline element being within the period defined between the first time and the second time, and the video clip comprising one or more cut out portions of the video recording of the sporting event, each cut-out portion being generated on the basis of the participant tracking data of the participant of the sporting event identified by the identifier of the first event record corresponding to the selected first timeline element.

13. A non-transitory computer-readable medium including computer program instructions, which when executed by an apparatus, cause the apparatus to:

receive a plurality of first event records, each first event record indicating a start time, an end time and an identifier of a participant of the sporting event;

generate a timeline of the sporting event and output the timeline for display, wherein the timeline indicates an elapsed time of the video recording of the sporting event along a first axis, the timeline indicates the identifier of the participant of the sporting event of each first event record along a second axis, and the timeline comprises a plurality of first timeline elements each corresponding to a respective first event record, each first timeline element extending along a portion of the first axis defined between the start time and the end time of its corresponding first event record and each first timeline element extending along a portion of the second axis associated with the identifier of the participant of the sporting event of its corresponding first event record;

receive participant tracking data indicative of a position of each participant of the sporting event identified by the identifier of one of the first event records at each of a plurality of times during the elapsed time of the video recording of the sporting event;

receive an input to select one of the first timeline elements when the timeline is displayed; and generate, in response to the selection of one of the first timeline elements, a video clip from the video recording of the sporting event and outputting the video clip for display, the video clip being a portion of the video recording of the sporting event temporally extending between a first time and a second time, each of the start time and the end time of the first event record corresponding to the selected first timeline element being within the period defined between the first time and the second time, and the video clip comprising one or more cut out portions of the video recording of the sporting event, each cut-out portion being generated on the basis of the participant tracking data of the participant of the sporting event identified by the identifier of the first event record corresponding to the selected first timeline element.

* * * * *